INVENTORS M. E. KROM
M. POSIN
BY
ATTORNEY

INVENTORS M. E. KROM
M. POSIN
BY
ATTORNEY

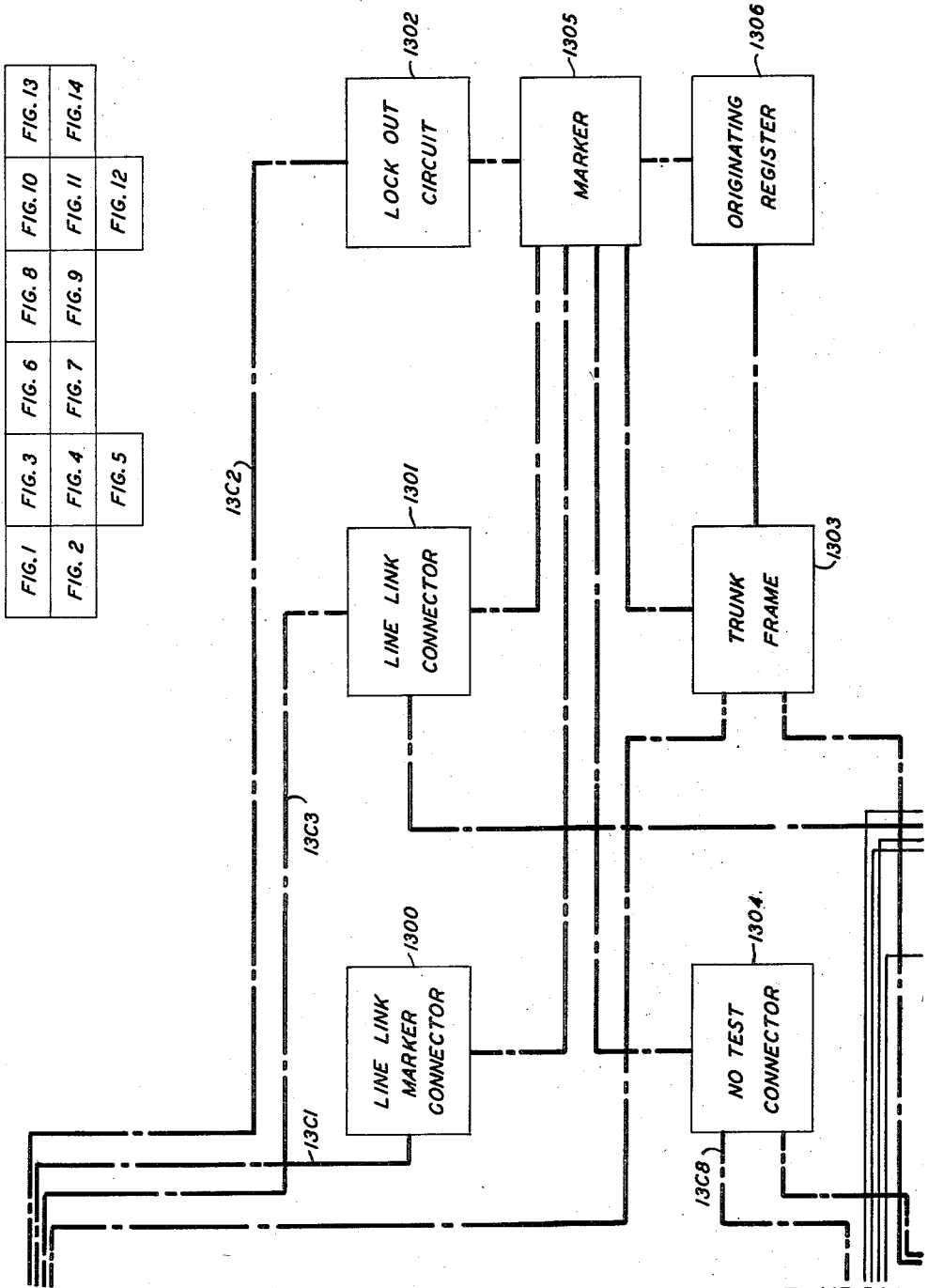

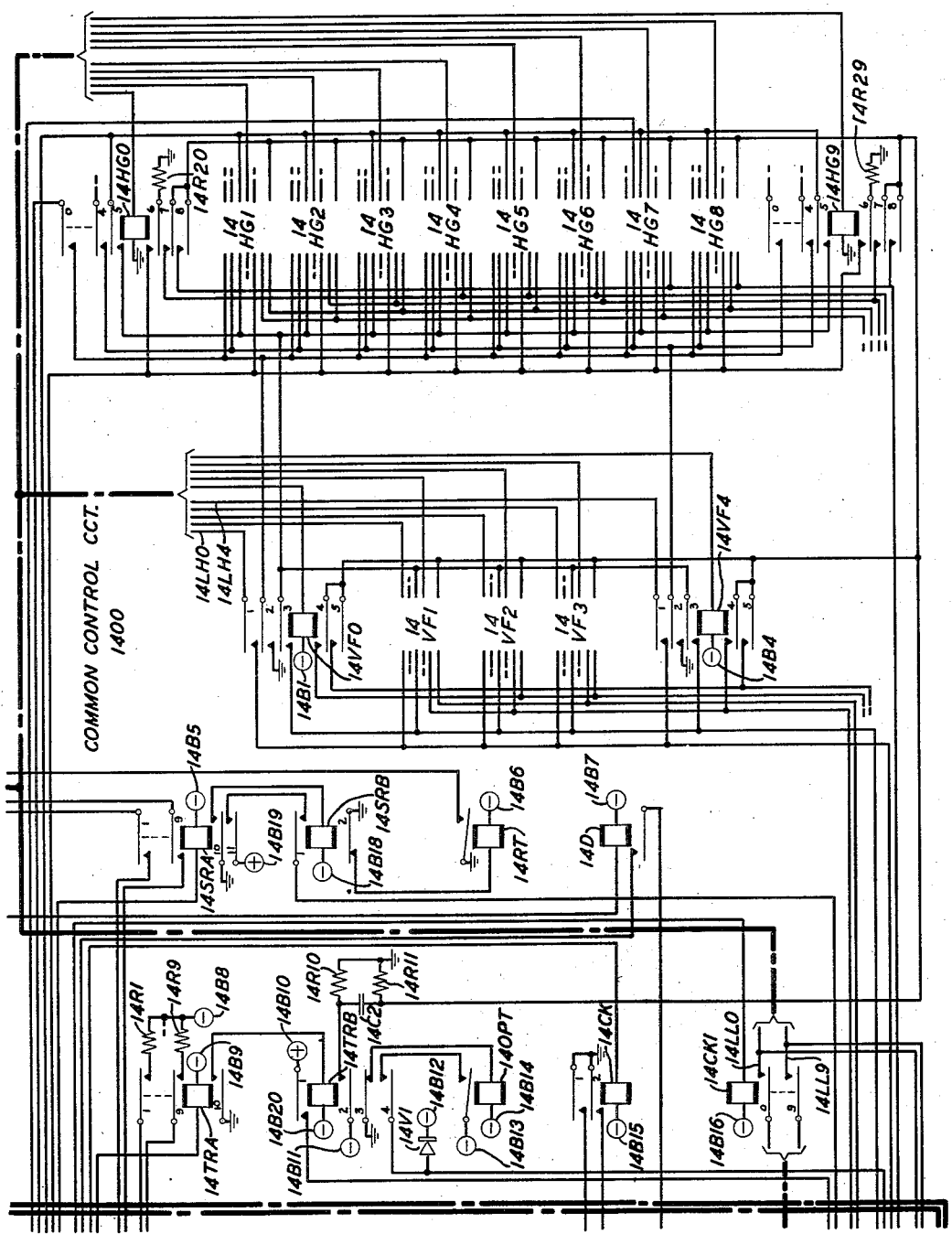

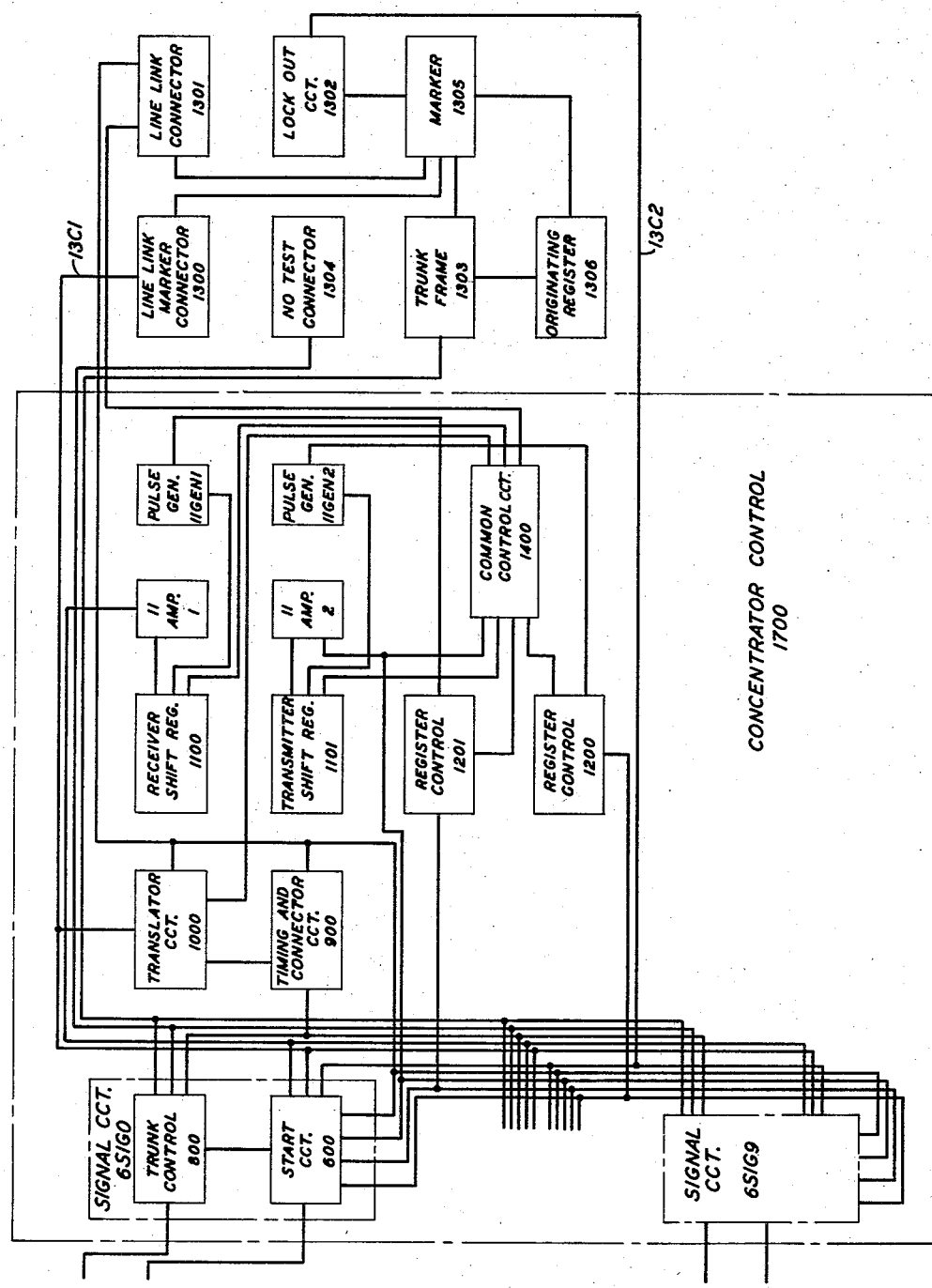

FIG. 19

| STAGE | PULSES | | | | | | | | |
|---|---|---|---|---|---|---|---|---|---|
| | 1 | 2 | 3 | 4 | 5 | 6 | 7 | 8 | 9 |
| 12BC1 | – | 0 | – | 0 | – | 0 | – | 0 | – |
| 12BC2 | 0 | – | – | 0 | 0 | – | – | 0 | 0 |
| 12BC3 | 0 | 0 | 0 | – | – | – | – | 0 | 0 |
| 12BC4 | 0 | 0 | 0 | 0 | 0 | 0 | 0 | – | – |

BINARY COUNTER STAGE POSITIONS

FIG. 18

SIGNALS TO AND FROM CONCENTRATOR CO-9

| TENS DIGIT | SHIFT REGISTER STAGES | | | | | | | | |
|---|---|---|---|---|---|---|---|---|---|
| | 1 | 2 | 3 | 4 | 5 | 6 | 7 | 8 | 9 |
| 0 | | | | x | | | | | |
| 1 | x | x | x | | | | | | |
| 2 | | x | | | | | | | |
| 3 | x | x | | | | | | | |
| 4 | x | | | x | | | | | |

| UNITS DIGIT | | | | | | | | | |
|---|---|---|---|---|---|---|---|---|---|
| 0 | | | | | | | x | | |
| 1 | | | | | | | | x | |
| 2 | | | | | x | x | | | |
| 3 | | | | x | x | | | | |
| 4 | | | x | x | | | | | |
| 5 | | | | x | | x | | x | |
| 6 | | | | | | x | x | | |
| 7 | | | | | x | | | x | x |
| 8 | | | | | | | x | | x |
| 9 | | | | | | | | x | x |

INVENTORS M. E. KROM
M. POSIN
BY
ATTORNEY 2,850,576

LINE CONCENTRATOR SYSTEM

Myron E. Krom, Convent Station, N. J., and Melvin Posin, New York, N. Y., assignors to Bell Telephone Laboratories, Incorporated, New York, N. Y., a corporation of New York Application October 4, 1955, Serial No. 538,334

24 Claims. (Cl. 179—18)

This invention relates to telephone systems and more particularly to subscriber line concentrating systems.

Each subscriber substation normally requires a pair of wires to connect it with the central office. For a substation which is located at a considerable distance from the central office the cost of these wires is substantial. In fact, in the present day telephone plant a large portion of the cost of installation and operation is that of the wire used in the subscriber loops between the substations and the central office. The utilization of line concentrating systems is attractive where the outside plant costs are high and the distances between groups of substations and the central office are large, while the number of substations and the amount of local interconnecting traffic among the substations is not adequate to justify their connection to a separate community dial office.

As the central office is not directly in information communication with the subscriber lines, due to the interposition of the remote line concentrator, it is generally necessary to provide a number of control leads to effect test and control functions. In order to obtain the greatest saving in the telephone plant, it is desirable to have a high ratio between the subscriber and trunk lines connected to a remote line concentrator, while keeping the number of control leads required to pass information signals to and from the concentrator to a minimum.

It is a general object of this invention to provide an improved communication system in which a large number of subscriber lines may be individually connected to a central office by a smaller number of common trunk lines whereby considerable saving in wire is attained.

Another object of the present invention is to provide a line concentrator system which effects economies in the wiring connecting central offices with subscribers' substations.

In crossbar telephone systems of the type described in the Patent 2,585,904, which issued to A. J. Busch on February 19, 1952, two basic types of switching frames are utilized; line link frames and trunk link frames which are interconnected by a network of junctors. Subscriber lines are associated with the line link frames, and all types of outgoing and incoming trunks, as well as originating registers for supplying dial tone and storing dialed numbers, are associated with the trunk link frames. Through this system of line and trunk link frames traffic flows in two directions: originating calls from a subscriber line appearance on a line link frame to a trunk appearance on a trunk line frame; and terminating calls from a trunk appearance on a trunk link frame to a line appearance on a line link frame. The establishment of all such connections is controlled by common circuits called markers. The line and trunk link frames served by a group of markers represents a switching unit called a marker group.

The number of markers in a marker group may vary from three to twelve depending upon the number of lines and trunks connected to the frames in the group. The marker holding time for establishing the connections for an originating or terminating call should be kept to a minimum. In crossbar systems, such as described in the above-identified patent to Busch, marker holding time is valued at many dollars per millisecond per marker. Concentrating systems, due to the necessity for passing information signals to and from the concentrator, tend to increase the marker holding time for establishing a connection, and thereby tend to require additional markers in the marker group.

It is an object of the present invention to provide a concentrating system for crossbar type telephone systems which does not materially increase the marker holding time. This is one of several objectives of the present invention which are factors in determining the type of signaling between the concentrators and the central office. Some of the other objects are to keep the number of control leads to a minimum, to avoid the utilization of potential sources at the concentrators, and to provide for no-test connections to the subscriber lines.

These and other objects are realized by a line concentrating system illustrative of the present invention wherein a vertical group of the primary line link switch becomes one of ten concentrators. Each of the ten concentrators is connected by ten trunks and six control leads to the central office. When a call is originated on one of the subscriber lines connected to a concentrator, the concentrator transmits signals representing the identity of the calling line over two of the six control leads to a central office control circuit. The signaling from the concentrator is on a direct-current sequential code basis utilizing a shift or step register in the concentrator which transfers the identity of the calling line to a shift or step register in the central office control circuit. A shift register has a number of stages for registering a set of characters which may be stepped, displaced or "shifted" one or more stages under control of shifting pulses applied to the shift register stages. Shifting or stepping pulses for the operation of the concentrator shift register are supplied over a second pair of the control leads from the central office. The central office receives the transmitted signals, calls in a marker and supplies a translation in decimal code of the transmitted signals thereto. The marker selects an idle one of the ten trunks, which connect the concentrator with the central office, connects an originating register to the control circuit and supplies the identity of the calling subscriber back to the control circuit. The control circuit supplies the calling line identity to the concentrator over the first signaling control pair, again utilizing the second control pair for the shifting pulses. The control circuit also transmits a direct-current connect potential over the tip and ring of the selected trunk concurrently with the coded signals representing the identity of the calling line, and connects the register to the selected trunk. The concurrent signals on the selected trunk and the signaling control pair cause the concentrator to connect the calling line to the selected trunk. The third control pair is utilized for miscellaneous functions in setting up the call such as start signals, line busy indications or no-test indications, etc. Terminating and call-back calls provide for substantially similar operation commencing with calling in a marker.

The utilization of the same rapid shift register signaling system for signaling to and from the concentrator is an important feature of the present invention. The shifting pulses to the concentrator, for operating a concentrator crosspoint to connect the calling line to the selected trunk, are at a kilocycle rate. The rapid signaling provides for the transfer of information to the concentrator substantially during the time that the marker selects one of the trunks for the call so that marker holding time is not materially increased.

Another feature of the present invention pertains to means for supplying power over the control leads to avoid the necessity of providing potential sources at the concentrators. The concentrators are designed to operate from a relatively small potential supplied from the central office.

Still another feature of the present invention resides in the provision over the trunk of a direct-current disconnect signal which is similar to the connect signal without the simultaneous signals over the signaling control pair. Means are provided at the central office to delay sending a disconnect signal while a call is being served, and to delay serving a call while a disconnect signal is being sent. The trunks respond to connect and disconnect signals but are insensitive to other potentials such as ringing, talking, etc.

Still another feature of the present invention involves the provision of a transistor line lockout and identifier circuit which simultaneously identifies a calling subscriber and locks out the others.

A further feature of the present invention relates to the provision of means at the concentrator for signaling the identity of utilized trunks over the control pair when a no-test connection is desired.

Further objects and features will become apparent to those skilled in the art upon consideration of the following description read in connection with the drawing wherein:

Figs. 1 through 14, when arranged in accordance with Fig. 15, are circuit representations of the line concentrating system of the present invention, wherein Fig. 1 illustrates the trunk circuits in the line concentrator of the present invention;

Fig. 13 illustrates diagrammatically some of the components in a crossbar telephone system;

Fig. 14 illustrates the common control circuit in the central office of the present invention;

Fig. 15 illustrates the arrangement of Figs. 1 through 14;

Figure 16:
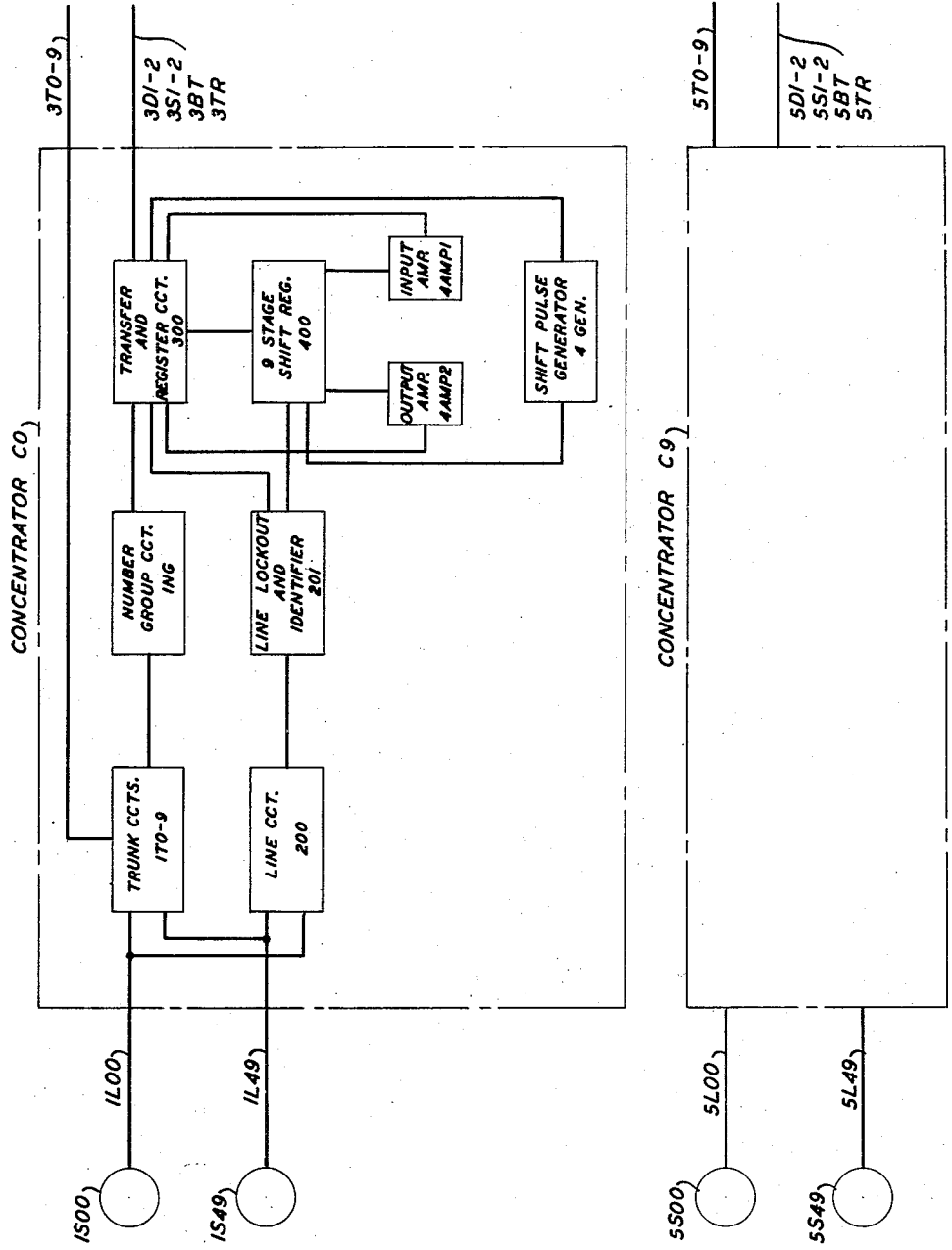

Figs. 16 and 17, when arranged with Fig. 16 to the left, are a box or functional diagram of the concentrator system of the present invention;

Fig. 18 is a table illustrating the coding of the signals to and from the concentrators of the present invention; and Fig. 19 is a table illustrating the positions of the binary counter stages in the register control circuits of the present invention.

Figure 1:
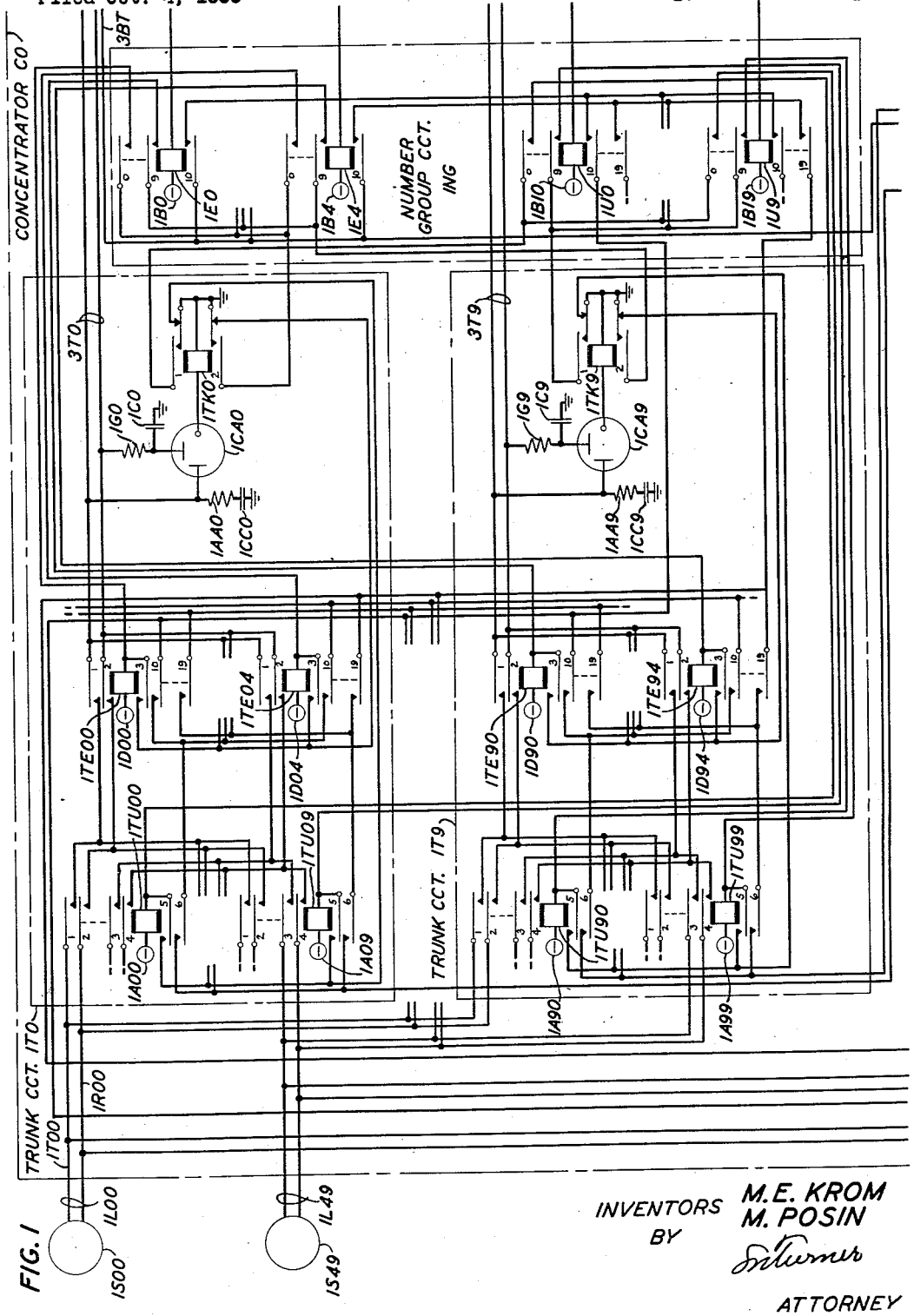
Figure 2:
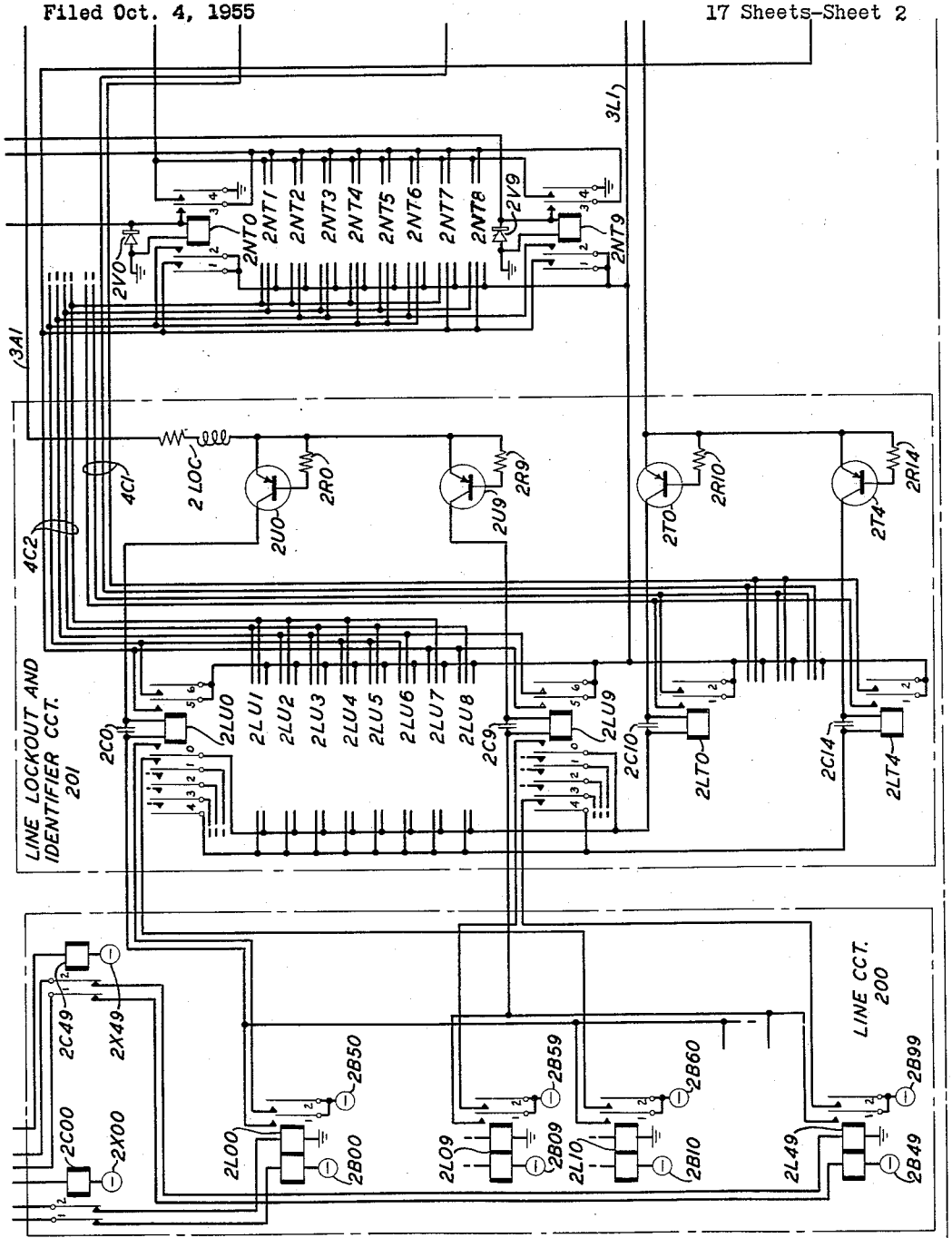
Fig. 2 illustrates the line circuit and line lockout and identifying circuit in the line concentrator of the present invention.
Figure 3:
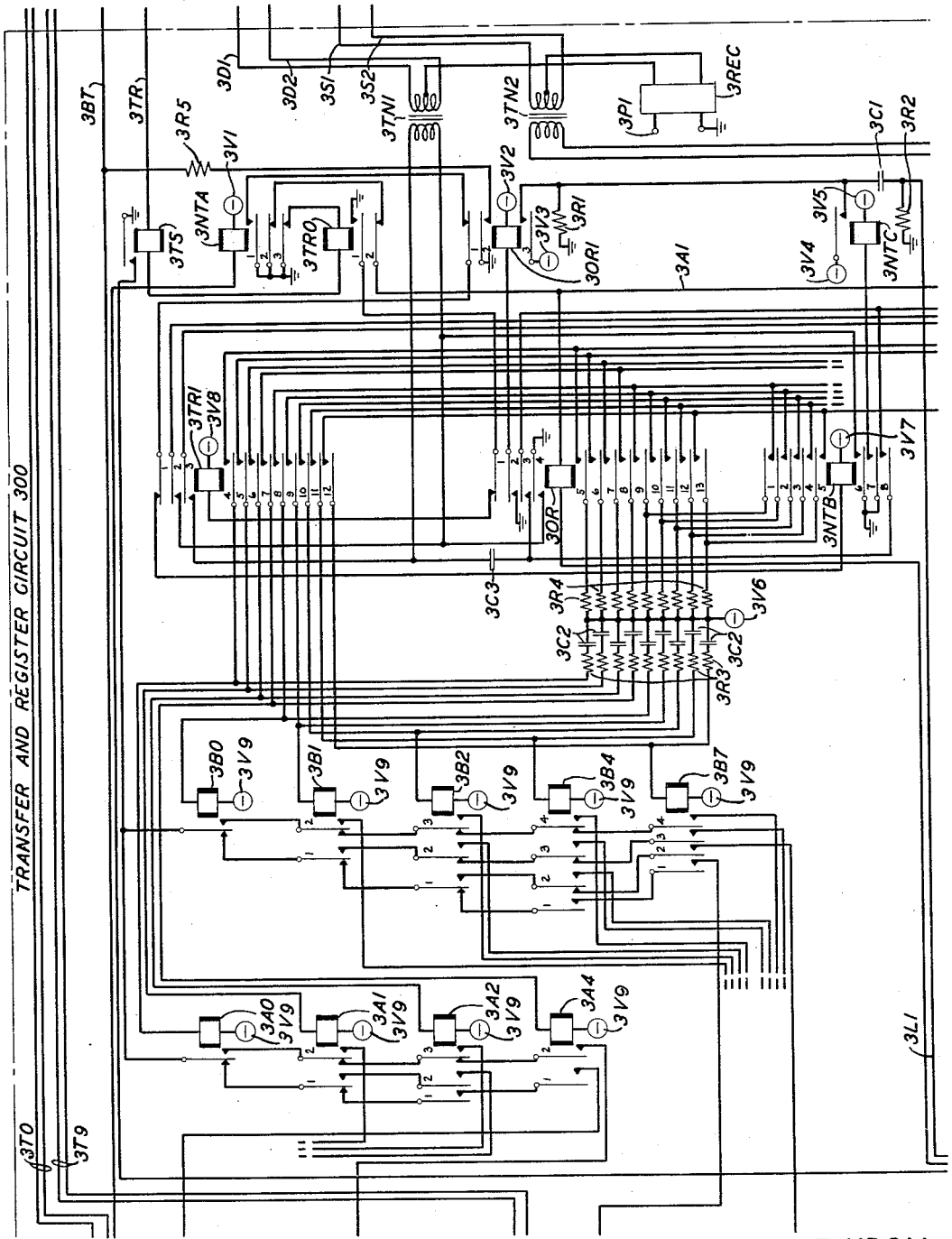
Fig. 3 illustrates the transfer and register circuit in the line concentrator of the present invention.
Figure 4:
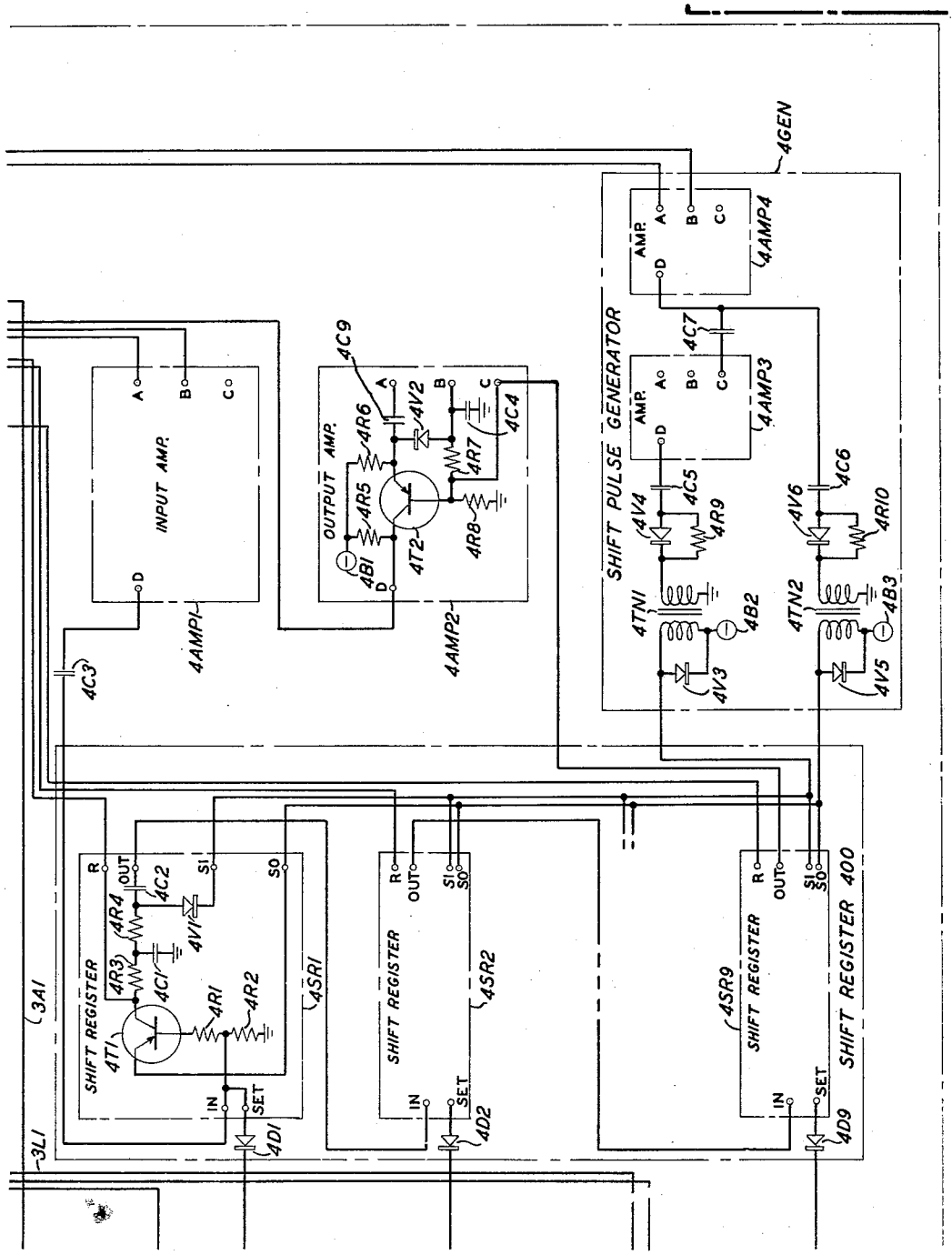
Fig. 4 illustrates the shift register and pulse generator in the line concentrator of the present invention.
Figure 5:
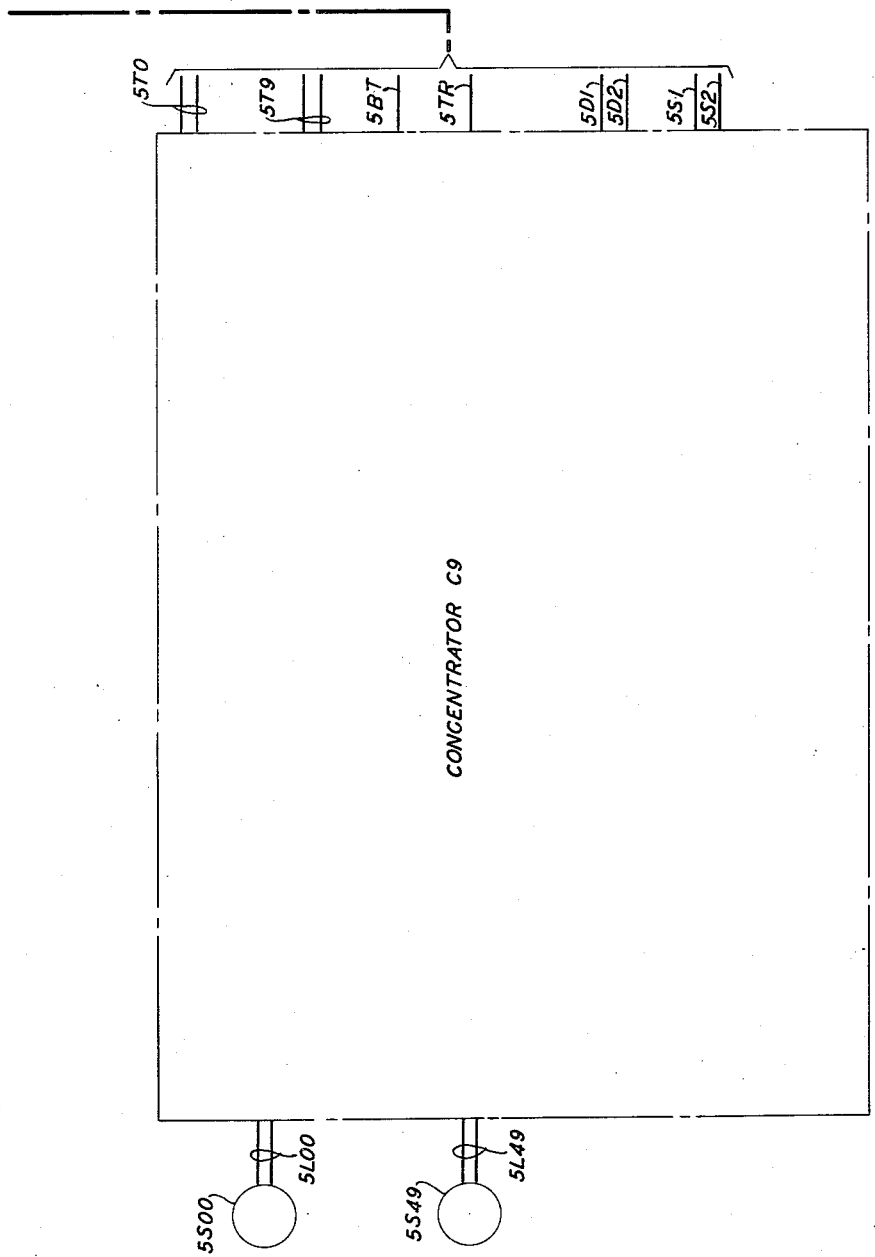
Fig. 5 illustrates diagrammatically another line concentrator of the present invention.
Figure 6:
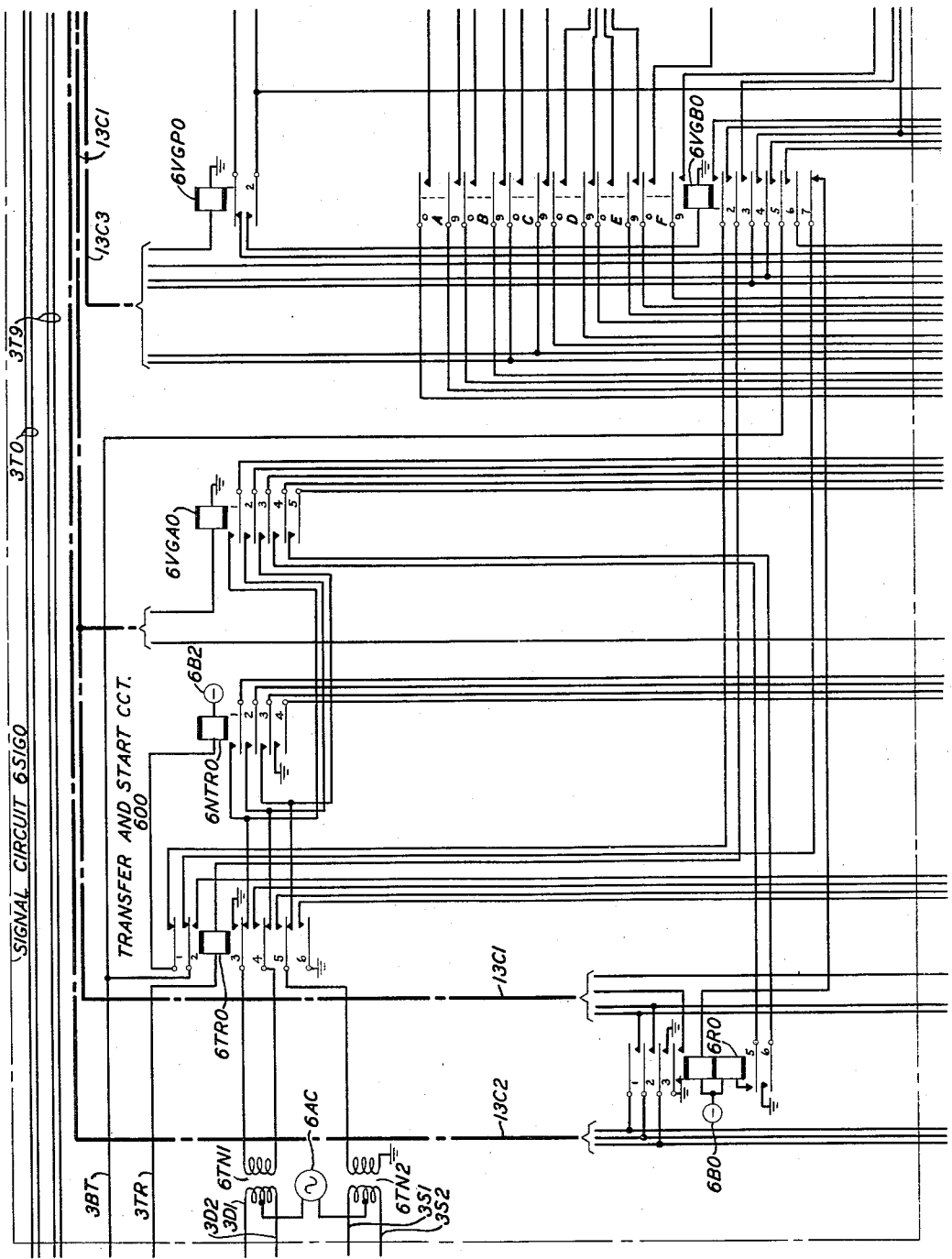
Figs. 6 and 8 illustrate a signal circuit in the central office of the present invention.
Figure 7:
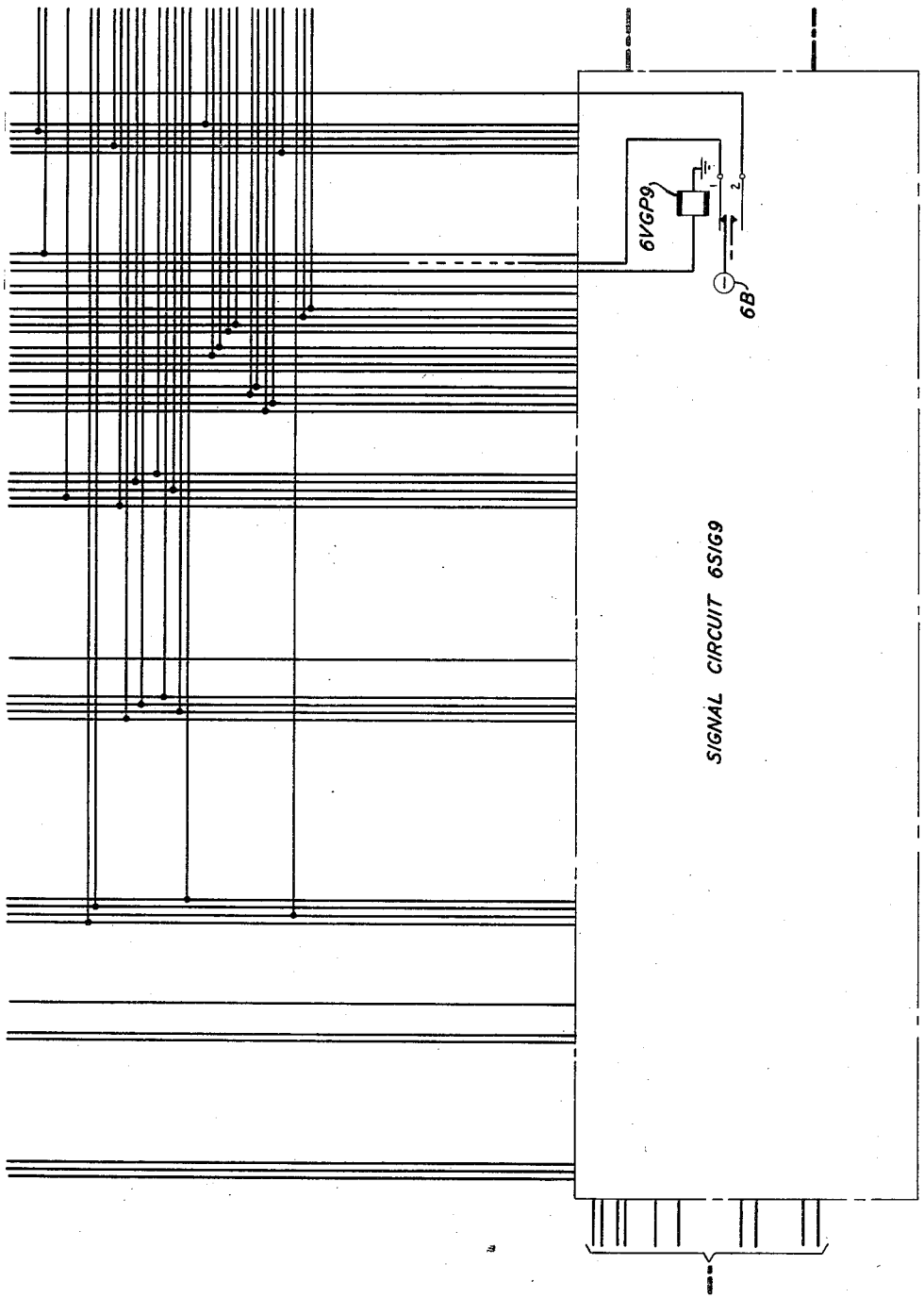
Fig. 7 illustrates diagrammatically another signal circuit in the central office of the present invention.
Figure 8:
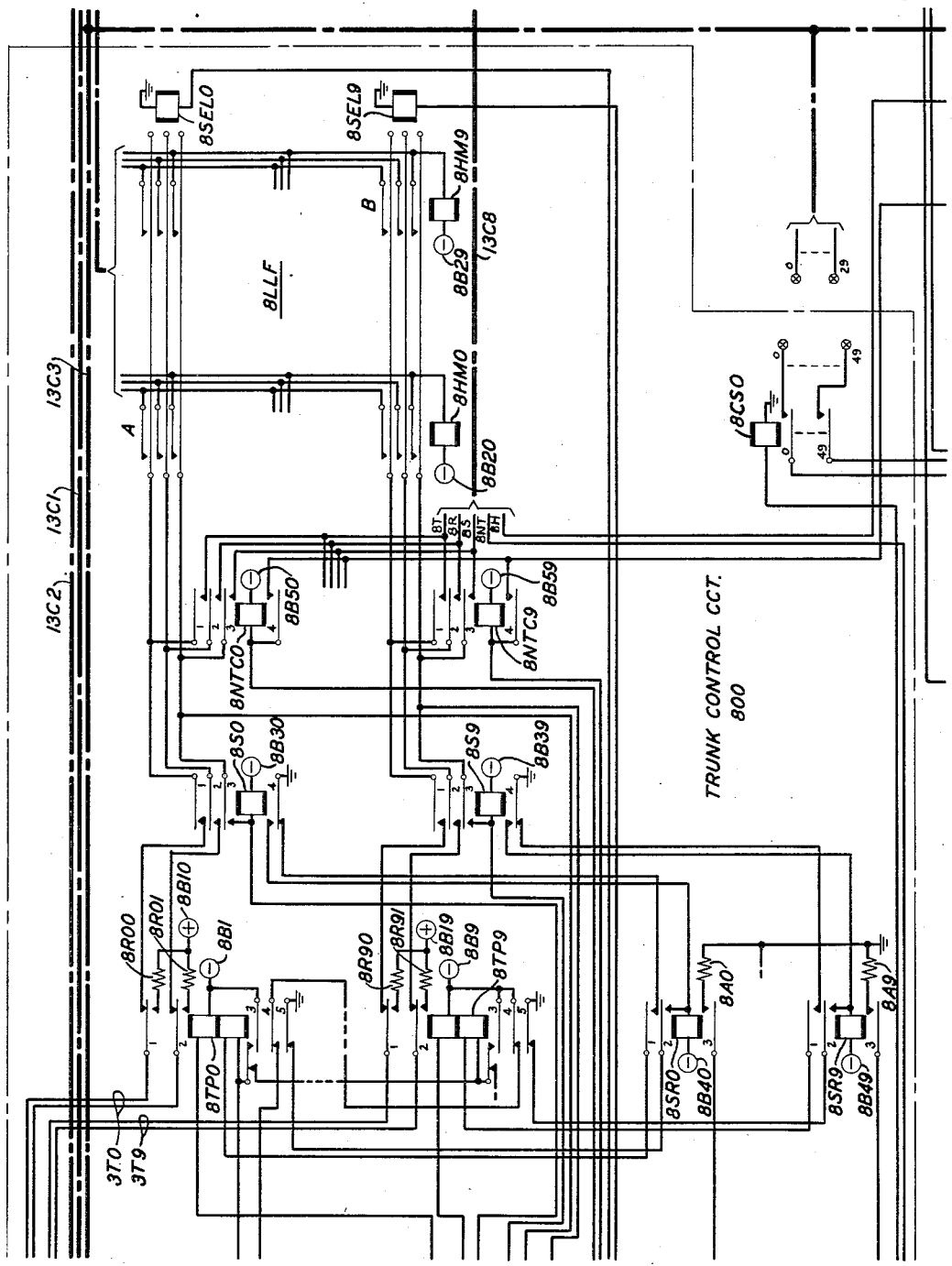
Figure 9:
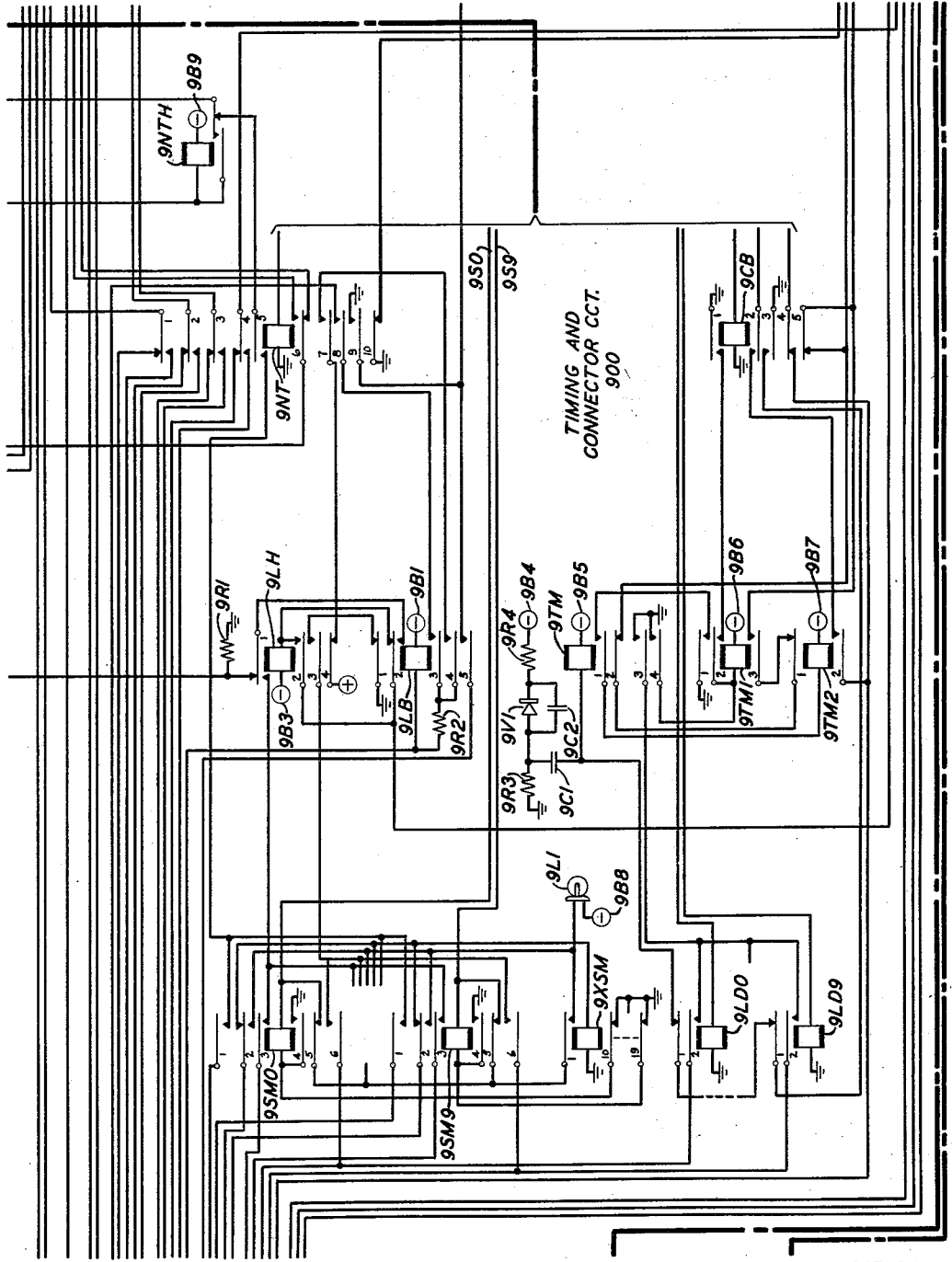
Fig. 9 illustrates a timing and connector circuit in the central office of the present invention.
Figure 10:
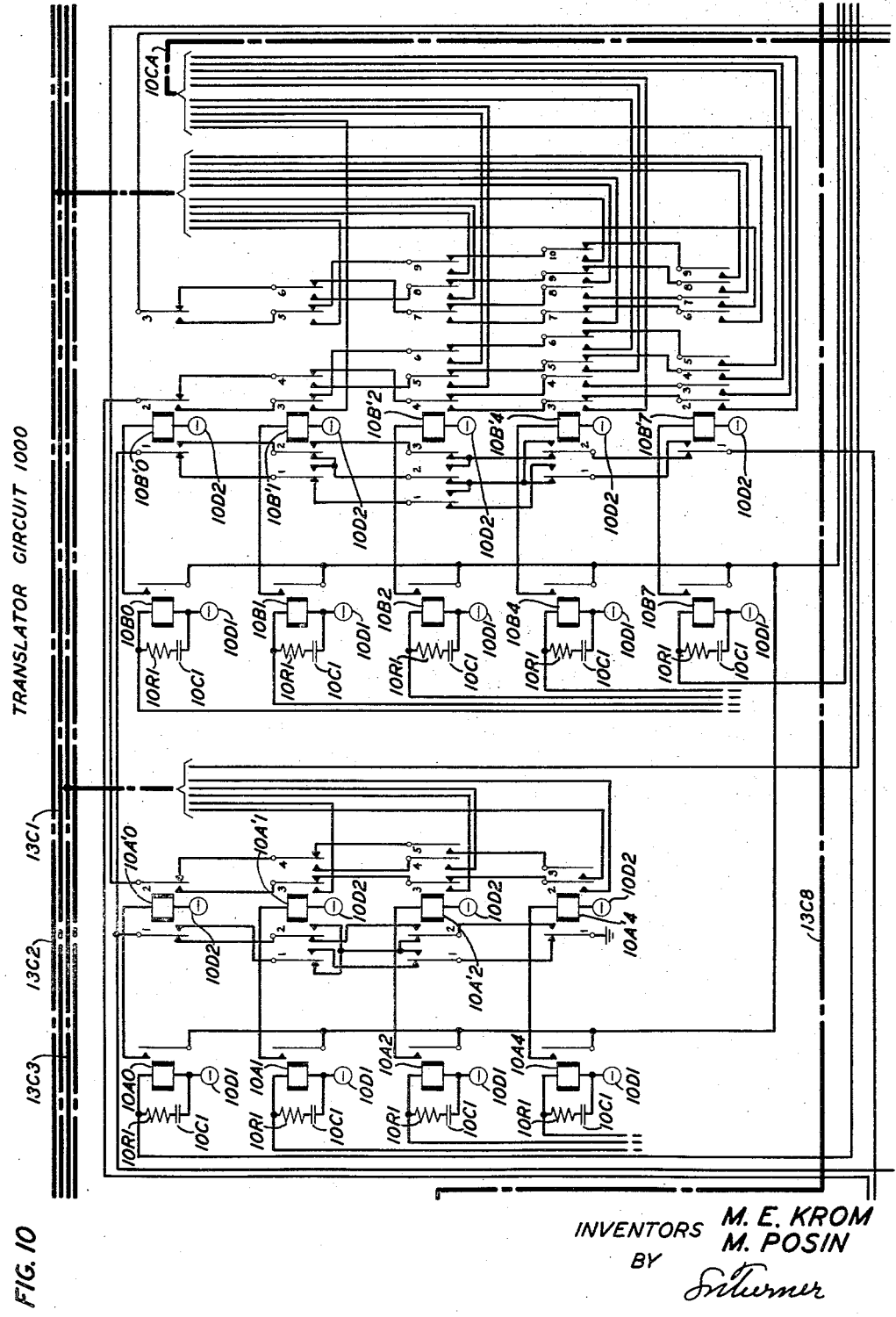
Fig. 10 illustrates the translator circuit in the central office of the present invention.
Figure 11:
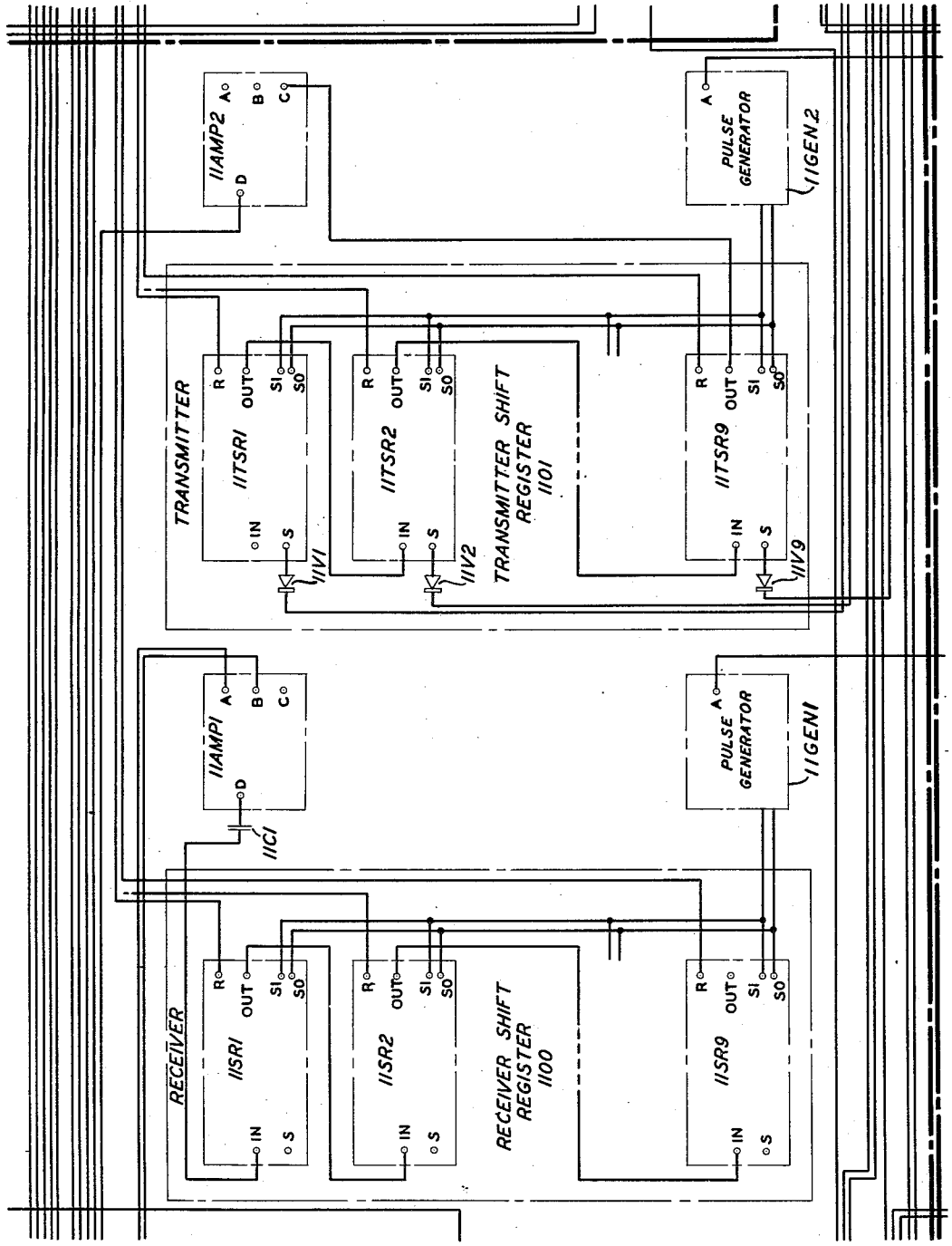
Figs. 11 and 12 illustrate the transmitting and receiving registers in the central office of the present invention.
Figure 12:
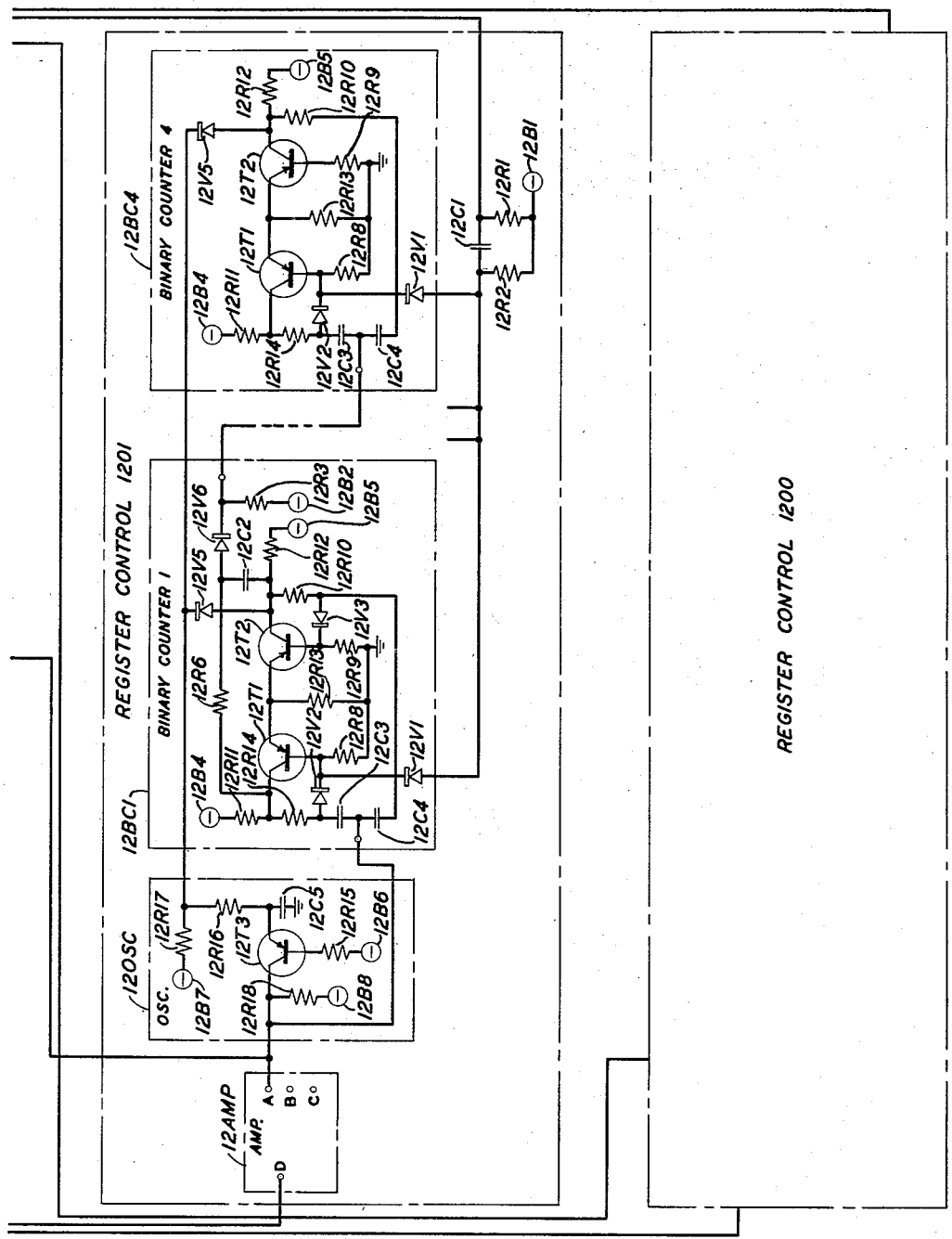

In the functional circuits of Figs. 16 and 17 and in the detailed circuits of Figs. 1 through 14, when arranged in accordance with Fig. 15, the equipment has generally been given letter designations representative of functional characteristics, preceded by a number which indicates the figure in the detailed circuits in which the equipment is located. The subscriber's station having an identifying number of 00, for example, is designated 1S00 and shown in Fig. 1 in the detailed circuits, and in Fig. 16 in the functional circuit.

GENERAL DESCRIPTION

Referring to Figs. 16 and 17, with Fig. 16 arranged to the left of Fig. 17, ten concentrators C0–9 are connected to the central office concentrator control 1700. All the equipment and circuits shown on Fig. 17 are located at the central office and the equipment and circuits shown on Fig. 16 are remotely located. Each of the concentrators C0–9 provides for a connection between any one of 50 subscriber stations and any one of ten talking trunks connecting the concentrator with the central office. The concentrator C0, for example, provides for connections between the substations 1S00–49, which are connected thereto, respectively, by the lines 1L00–49, and the ten trunks 3T0–9. Each of the ten concentrators C0–9 is also connected to the central office concentrator control 290 by six leads; the concentrator C0, for example, by the leads 3D1–2, 3S1–2, 3BT and 3TR and the concentrator C9 by the leads 5D1–2, 5S1–2, 5BT and 5TR. The concentrators C0–9 do not include potential sources. The operating power is supplied on a simplex loop basis over the leads 3D1–2 and 3S1–2 for concentrator C0, and leads 5D1–2 and 5S1–2 for concentrator C9.

The concentrators C0–9 and the control 1700 are connected into a crossbar telephone system of the type described in the Patent 2,585,904 which issued to A. J. Busch on February 19, 1952. The connectors 1304, 1300, 1301, the register 1306, the lockout circuit 1302, the marker 1305 and the trunk frame 1303 are standard components in crossbar systems of this type.

In crossbar telephone systems two basic types of switching frames are utilized; trunk frames such as trunk frame 1303 and line link frames, not shown in the functional circuits of Figs. 16 and 17. The frame 8LLF, which is part of the trunk control circuits 800 in the signal circuits 6SIG0–9, is equivalent to the secondary of the ordinary crossbar line link frame. Ordinarily, subscriber lines are associated with the line link frames and all types of outgoing and incoming trunks are associated with the trunk frames. The general effect of the concentrators C0–9 and the control 1700 is to remove the function of the primary line link frame to a remote point so as to reduce the conductor mileage connecting the subscribers to the central office. The concentrators C0–9 are, in this manner, inserted between the frames 8LLF in the circuits 800 and the subscriber stations 1S00–49, 5S00–49, etc. Each one of the concentrators C0–9 in the concentrating system represents one vertical group of the ordinary primary line link frame.

When a call is originated on one of the lines 1L00–49, a sequence of operations is initiated for establishing a connection therefrom, through concentrator C0 and one of the talking trunks 3T0–9, to an originating register 1306 in the central office. When a call is originated on the subscriber line 1L00, for example, the line circuit 200 is operated to indicate the demand for service, or request for dial tone. The operation of the line circuit 200 initiates the operation of a line lockout and identifier circuit 201 which locks out the other 49 lines 1L01–49 connected to concentrator C0, and which identifies the calling line 1L00.

The line lockout and identifier circuit 201 operates the transfer and register circuit 300 which supplies a start, or service request, indication over lead 3BT to the start circuit 600 in the signal circuit 6SIG0. The circuit 300 also readies a nine-stage shift register 400, connects an output amplifier 4AMP2 from the register 400 to the signal leads 3D1–2, and operates the line lockout and identifier circuit 201 to supply the identity of the calling line 1L00 to the nine-stage shift register 400 in a two-out-of-four code for the tens digit, and the two-out-of-five code for the units digit. A shift register is a device which consists of a series of bistable circuits which are interconnected so that a shift pulse applied simultaneously to each bistable circuit or stage causes the information stored in an individual stage to transfer or to shift to the next succeeding stage. The operation of the line lockout and identifier circuit 201 sets the nine stages of the shift register 400 in accordance with the identity of the calling line. The shift register 400 is connected to a shift pulse generator 4GEN which is connected through leads 3S1-2 to the central office.

As described above, when the transfer and register circuit 300 connects the amplifier 4AMP2 to the signal leads 3D1-2, it also applies a service request signal through the lead 3BT to signal the central office that a call is waiting to be served. The lead 3BT is connected to the start circuit 600 in the signal circuit 6SIG0. There are ten signal circuits 6SIG0-9 in the concentrator control 1700, one for each of the concentrators C0-9. When the start circuit 600 receives the service request indication from the concentrator C0, it calls in the marker 1305 through the line link marker connector 1300 and cable 13C1, and provides an identification of the concentrator C0 thereto. The start circuit 600 also initiates the operation of a lockout circuit 1302. The lockout circuit 1302 prevents a false serve request indication calling in a marker during callback when the connection to the calling line 1L00 is interrupted.

When the line link marker connector 1300 seizes the marker 1305 and passes thereto the signals from the start circuit 600, it provides an operating potential back to the start circuit 600, which thereupon completes the signal paths through the leads 3D1-2 from circuit 300 to the receiving amplifier 11AMP1. The amplifier 11AMP1 is associated with the receiver shift register 1100. The start circuit 600 also connects a path from circuit 300 through the shift leads 3S1-2 to a register control circuit 1201, and operates the common control circuit 1400. The circuit 1400 connects a translator circuit 1000 to a nine-stage shift register 1100 and applies a pulse to the register control circuit 1201. The circuit 1201 thereupon transmits nine pulses to the shift sequence pulse generator 11GEN1, and through the start circuit 600, shift leads 3S1-2 to the concentrator circuit 300. These shift pulses cause the information, which is stored in the concentrator shift register 400, to be shifted through the signal leads 3D1-2 to the receiving shift register 1100 in the central office. The signals are shifted through leads 3D1-2, start circuit 600 and amplifier 11AMP1 to the receiver shift register 1100.

The common control circuit 1400 inhibits the operation of the translator circuit 1000 until after the shifting operation from the concentrator C0 to the concentrator control circuit 1700 is over. When the shifting sequence is completed, the common control circuit 1400 allows the translator circuit 1000 to register the calling line identity supplied from register 1100. The information is registered in a two-out-of-four code for the tens digit and a two-out-of-five code for the units digit. The common control circuit 1400 thereupon checks the information registered in the translator circuit 1000 to verify that two, and only two pieces of information are indicated for each digit. When the check is completed, the translator 1000 supplies a decimal indication of the units and the tens digit of the calling line, as horizontal group and vertical file indications for the marker 1305.

The marker 1305, having this information, seizes the concentrator control circuit 1700 through the line link connector 1301, and supplies the vertical group, or concentrator, identity together with the vertical file and horizontal group information thereto. The vertical group information determines which one of the signal circuits 6SIG0-9 is to be selected, and the horizontal group and vertical file information determines which subscriber's line in the concentrator associated with the selected signal circuit is wanted. The horizontal group and vertical file information is recorded by the common control circuit 1400, which operates the start circuit 600 and the circuit 300. The circuit 300 is operated over lead 3TR to transfer the signaling leads 3D1-2 and 3S1-2 for signaling the identity of the calling line back to the concentrator C0. The control circuit 1400 also translates the registered identity of the tens and units digits, or the horizontal group and vertical file indication, to the two-out-of-four and two-out-of-five direct-current pulse code. When the start circuit 600 transfers the leads 3D1-2 and 3S1-2, it provides an indication thereof back to the common control circuit 1400. Responsive thereto, the common control circuit 1400 connects a readying potential to register 1101, supplies the coded identity of the calling line to the shift register 1101 and then initiates the operation of a register control 1200. The register control 1200 supplies nine shift pulses to the pulse generator 11GEN2, and also through the start circuit 600 and leads 3S1-2 to the concentrator C0.

At the concentrator C0, when the circuit 300 is operated to transfer the leads 3D1-2 and 3S1-2 for a signaling operation, it returns the shift register 400 to normal, releases circuit 201 and connects the input amplifier 4AMP1 to the leads 3D1-2. When the shift pulses are applied to leads 3S1-2 by the register control 1200 they are connected through the circuit 300 and the pulse generator 4GEN to the register 400. The information registered in the register 1101 is, in this manner, transferred through amplifier 11AMP2, circuit 600, leads 3D1-2 and amplifier 4AMP1 to the register 400.

The register 400 supplies the information, on a two-out-of-four and two-out-of-five basis, to the circuit 300. The circuit 300 translates the coded information to a decimal indication and supplies it to the number group circuit 1NG.

When the marker 1305 is connected to the concentrator control 1700 through the connector 1301, it also obtains access thereto for selecting an idle one of the trunks 3T0-9 in setting up the call. The marker 1305 operates the connector circuit 900 in accordance with the identity of the selected trunk. The connector circuit 900 supplies the identity of the selected trunk, 3T0 for example, to the trunk control circuit 800 which connects a high positive voltage over both sides of the selected trunk 3T0 toward the concentrator C0 as a seizure potential, and readies a path from the trunk frame 1303 to the trunk 3T0.

The seizure potential, which is provided by circuit 800, is supplied through the trunk 3T0 to the trunk circuit 1T0. Each trunk 3T0-9 is connected to the 50 calling lines 1L00-49, associated with the concentrator C0, by means of the associated one of the trunk circuits 1T0-9. The operation of the trunk circuit 1T0, associated with the selected trunk 3T0, is controlled by the number group circuit 1NG in accordance with the identity of the calling line. The seizure potential, provided through the trunk 3T0 to the trunk circuit 1T0, in this manner, effectively closes a crosspoint, or provides a connection, between the calling line 1L00 and the trunk 3T0. When the trunk circuit 1T0 is operated, it also operates the line circuit 200 to provide a line busy indication through the circuit 300, lead 3BT, to the timing and connector circuit 900 as an indication that the line crosspoints are closed. Operation of the circuit 900 controls the trunk control circuit 800, which removes the high voltage seizure potential, and completes the path from trunk 3T0 to trunk frame 1303. The trunk frame 1303, responsive to the connection of trunk 3T0 thereto, provides an indication to the marker 1305 that the line crosspoints are closed. When the marker 1305 receives this indication, it connects the originating register 1306 through trunk frame 1303 to the trunk control circuit 800 to supply dial tone over trunk 3T0 through concentrator C0 to the calling line 1L00. When the register 1306 is connected to the calling line 1L00 the marker 1305 disconnects.

The marker holding time for servicing the call to provide dial tone was approximately 300 milliseconds. Due to the utilization of rapid signaling from the central office, the concentrator C0 is readied during the time that the marker 1305 selects the trunk 3T0 so that only approximately 6 milliseconds are added to the total marker holding time.

When the originating subscriber at substation 1S00 receives dial tone and dials, the dialed digits are registered in the originating register 1306. At the completion of dialing, the register 1306 summons a marker 1305 and passes to it all the information necessary to complete the call, including a record of the line-to-register linkages and the identity of the calling and called subscribers. The marker 1305 releases the register 1306 and proceeds, after having ascertained that a linkage is available, to establish the line-to-trunk connection. The line-to-trunk connecting is referred to as callback.

A call-back call, in conjunction with a concentrated line such as 1L00, is somewhat more complex than one in conjunction with an ordinary line which is not connected to a concentrator because the line-to-trunk connection at the concentrator C0 is locked operated and must receive a distinct release signal in order to disconnect. For the ordinary line, the marker 1305 has direct control through the line link and trunk link frames of the linkage. Such control is absent from the line-to-trunk connection through the concentrator C0. This connection must be released on each call-back call because the link which is selected by the marker 1305 for the line-to-trunk connection on callback is not necessarily the same as that used for the line-to-register connection, described above. Provision has therefore been made for applying a release signal on the selected trunk which was utilized for the line-to-register connection preceding the establishment of the call-back or line-to-trunk linkage, whenever the switch linkage is released at the central office. In the concentrator system described herein, the marker 1305 makes use of the recorded line linkages to release the line-to-register connection at the concentrator C0 before establishing the line-to-trunk connection.

When the marker 1305 is ready to establish the line-to-trunk linkage, it selects the line link frame in which the concentrator C0 appears in the regular manner, as described above in the above-identified patent to Busch. The marker 1305 supplies decimal coded signals representing the identity of the calling line, through line link connector 1301, to the common control circuit 1400 and an indication that the operation is for a callback call, to the timing and connector circuit 900. The circuit 900 operates to delay the transfer operation of the circuit 600, in order to prevent the transmission of the identity of the calling subscriber through the circuit 600 to the transfer and register circuit 300 in the concentrator C0. The disconnect signal, hereinafter described, is identical to the seizure, or connect, signal which is supplied over the tip and ring of the selected one of trunks 3T0–9. For a connect operation the control 1700 supplies the coded signals to the concentrator C0 before the transmission of the seizure potential over the selected one of trunks 3T0–9. When the seizure potential alone is transmitted, it functions as a disconnect instead of a connect potential.

The timing and connector circuit 900 controls the transmission of the disconnect potential from the trunk control circuit 800, and times the duration of the disconnect potential to allow for releasing the trunk circuit 1T0 in the concentrator C0. When the trunk circuit 1T0 receives the disconnect potential through the trunk 3T0, it opens the connection between the line 1L00 and the trunk 3T0. At the end of the timing interval, the timing and disconnect circuit 900 causes the trunk control circuit 800 to remove the disconnect potential from the trunk 3T0, and thereafter operates the circuit 600 and the transfer and register circuit 300 in the concentrator C0 to permit the connection of the subscriber's line 1L00 to a newly selected one of the trunks 3T0–9. The marker 1305 selects the new trunk. From this point on the sequence of operation for callback is quite similar to the sequence of operation described above for supplying dial tone to the calling line. If trunk 3T9 is selected by the marker 1305 for the establishment of the connection, the timing and connector circuit 900 causes the trunk control circuit 800 to supply a connect potential over the trunk 3T9, and the common control circuit 1400 causes the register 1101 to simultaneously supply the coded signals through the circuit 600, the leads 3D1–2 to the circuit 300. The signals are registered in register 400 and supplied back to circuit 300. The circuit 300 functions to translate the two-out-of-four and two-out-of-five coded signals to a decimal coded indication, and to supply it to the number group circuit 1NG. The number group 1NG supplies this information to the trunk circuits 1T0–9, which, together with the connect potential on trunk 3T9, provides for a connection from the calling line 1L00 through the trunk circuit 1T9 to the trunk 3T9.

Mutual lockout occurs between the start circuit 600 and the trunk control 800 so that either service request or disconnect can occur at any one time. Whichever occurs first delays servicing the other. Lockout also must exist between originating and terminating calls that occur simultaneously since the same concentrator control 1700 is utilized in the central office. The marker 1305 determines which call is to be served. If a dial tone call is waiting and a terminating call has preference, the dial tone call will be locked in until the terminating call is served unless the terminating call is for the same line. If the terminating call is for the same line, the dial tone request will be cancelled.

In general, as described above, all calls are treated as terminating calls when establishing the connections at the concentrators C0–9 and in the central office. Transmission of information from the concentrators C0–9 is generally limited to passing the calling line number to the central office and thereafter the call is treated as a terminating call.

A terminating call to a concentrator line, such as 1S00–49 or 5S00–49, is completed by a marker 1305, in a manner very similar to that employed for a regular line appearance on a line link frame. Having obtained access to the frame through the line link connector 1301, the marker 1305 operates the control circuit 1400 and the connector circuit 900 through the line link connector 1301. The common control circuit 1400 registers the identity of the terminating line and operates the circuit 600 so that the identity of the terminating line may be transmitted to the concentrator C0. When the timing and connector circuit 900 operates, it causes the register 1101, under control of the circuit 1400, to supply the coded signals to the register 400 in the concentrator C0. If the terminating line is busy, the line circuit 200 supplies an indication thereof back through the control lead 3BT, the circuit 600, the timing and connector circuit 900, and the line link connector 1301 to the marker 1305. This indication to the marker 1305, that the line is busy, causes the marker 1305 to dismiss the line link frame and the concentrator C0 and to proceed to return line busy tone to the distant calling subscriber. When the line is busy, the timing and connector circuit 900 prevents the circuit 800 from sending the connect potential.

If the terminating line is idle, a line busy indication is not provided to the marker 1305 and the marker 1305 operates the trunk control circuit 800 through the trunk frame 1303. The trunk control circuit 800 thereafter functions to supply a connect potential to the concentrator C0 to close, or operate, the corresponding trunk circuit 1T9 associated with the selected trunk 3T9, in a manner similar to that described above for an originating call. When the trunk circuit 1T9 is operated, it provides an indication thereof to the connector circuit 900 which causes the circuit 800 to remove the connect potential, and to complete the path from trunk 3T9 to trunk frame 1303.

For a no-test call, the sequence of operations is somewhat different because if the line is busy, the concentrator system of the present invention must provide the identity of the trunk 3T9 which is utilized for the line being tested. The no-test call commences as a terminating call except that an indication that the call is a no-test call is provided by the marker 1305 to the connector 900. The direct-current coded signals, described above, are supplied to the concentrator C0. If the line, 1L00 for example, is busy, a busy indication is provided to the connector 900 which supplies a no-test potential through the circuit 600 and lead 3BT to the circuit 300.

Responsive to the no-test potential, the circuit 300 controls the register 400 to provide coded signals on a two-out-of-five basis representing the identity of the busy one of the trunks 3T0–9 over the leads 3D1–2 through the circuit 600 to the register 1100. The busy one of trunks 3T0–9 is the one connected to line 1L00. The coded signals are translated by the translator 1000 to a decimal indication of the trunk and sent through the connector 1301 to the marker 1305.

When the marker 1305 receives the identity of the utilized trunk, 3T9 for example, it connects the no-test connector 1304 through the trunk control circuit 800 to the trunk 3T9 to bridge the established line-to-trunk connection which provided for the busy indication. After establishing this bridging connection, the marker 1305 releases, leaving the bridging connection locked to the connector 1304. The line-to-trunk connection is still controlled by the calling and called subscribers, either of whom may initiate disconnect by hanging up.

DETAIL CIRCUIT DESCRIPTION
Originating call

Essentially the concentrating system shown in Figs. 1 through 14, when arranged in accordance with Fig. 15, performs the function of removing the primary line switch frame of the crossbar system from the central office to a remote point so as to reduce the conductor mileage connecting the subscribers to the central office. A vertical group of the primary line switch becomes one of ten concentrators C0–9 in the concentrator system. Each of the concentrators C0–9 is connected by ten talking trunks and three control pairs to the central office and has connected thereto a maximum of 50 subscribers' lines. The detail circuit representation of concentrator C0 is shown in Figs. 1 through 4, with 50 substations 1S00–49 connected, respectively, through subscribers' lines 1L00–49 thereto. The concentrator C0 is in turn connected by means of the ten talking trunks 3T0–9 and six control leads 3BT, 3TR, 3D1–2 and 3S1–2 to the central office, which is shown in Figs. 6 through 14.

The concentrators C0–9 are connected into a crossbar telephone system of the type described in the Patent 2,585,904 which issued to A. J. Busch on February 19, 1952. The connectors 1304, 1300, 1301, the register 1306, the lockout circuit 1302, the marker 1305 and the trunk frame 1303 are standard components in such crossbar systems.

In such crossbar telephone systems two basic types of switching frames are utilized: trunk frames such as trunk frame 1303 and line link frames, not shown in the functional circuits of Figs. 16 and 17. The frame 8LLF, which is part of the trunk control circuits 800 in the signal circuits 7SIG0–9, is equivalent to the secondary of the ordinary crossbar line link frame. Ordinarily subscriber lines are associated with the line link frames and all types of outgoing and incoming trunks are associated with the trunk frames. The general effect of the concentrators C0–9 is to remove the function of the primary line link frame to a remote point so as to reduce the conductor mileage connecting the subscribers to the central office. The concentrators C0–9 are in this manner inserted between the frames 8LLF in the circuits 800 and the subscriber stations 1S00–49, 5S00–49, etc. A vertical group of the ordinary primary line link switch or frame becomes one of the concentrators C0–9 in the concentrating system.

When a call is originated at the substation 1S00, for example, an individual associated line relay 2L00 in the line circuit 200 is operated to indicate the demand for service. The origination of a call at the substation 1S00 completes a path from ground through the right winding of relay 2L00, the right normal contact of the cut-off relay 2C00 through the tip lead 1T00 of the line 1L00, the substation 1S00, the ring lead 1R00 of the line 1L00, the left normal contact of relay 2C00 and the left winding of the line relay 2L00 to the battery 2B00 causing relay 2L00 to operate. The battery 2B00 and all the other potential sources in the concentrator C0 are illustrated as independent sources of potential for convenience. The concentrator C0, however, does not include any potential sources. All the operating power for the concentrator C0 is supplied from the alternating-current source 6AC in the central office. The source 6AC is connected through the secondary windings of transformers 6TN1 and 6TN2 in the central office and of the transformers 3TN1 and 3TN2 in concentrator C0 and rectifier 3REC to terminal 3P1. The terminal 3P1 is in effect the −24 volt direct-current voltage supply for the concentrator C0. The left winding of relay 2L00, for example, should be connected to terminal 3P1 but is instead connected to battery 2B00 for convenience. All the illustrated batteries or potential sources in the concentrator C0 are −24 volt sources.

The operation of the line relay 2L00 in the line circuit 200 initiates the operation of the line lockout and identifier circuit 201 to lock out the other 49 line relays 2L01–49 and to identify the calling line 1L00. The line lockout and identifier circuit 201 has ten units relays 2LU0–9 and five tens relays 2LT0–4 which indentify the calling line on a decimal basis. When relay 2L00 in the line circuit 200 is operated, an operating path for the units relay 2LU0 is closed from the battery ground at the normal armature 2 of relay 3NTA in the transfer and register circuit 300, through the normal armature 2 of the transfer relay 3TR, lead 3A1, the lockout impedance 2L0C, the transistor 2U0, the winding of relay 2LU0 shunted by capacitor 2C0 and the operated armature 1 of relay 2L00 to the negative potential source 2B50. In a similar manner the armature 1 of each of the line relays 2L00–47 is connected in series with the winding of one of the line units relays 2LU0–9 corresponding to the units number of the calling line. The windings of the relays 2LU0–9 are bridged, respectively, by the capacitors 2C0–9 and connected through the transistors 2U0-9 to the lockout impedance 2L0C. The base electrodes of the transistors 2U0–9 are connected, respectively, through resistors 2R0–9 to their associated emitter electrodes. When relay 2L00 operates the transistor 2U0 becomes conducting and allows relay 2LU0 to operate. By virtue of the negative impedance characteristic exhibited by the transistor 2U0 and the fact that the lockout impedance 2L0U is connected to each of the transistors 2U0–9, only one of the line units relays 2LU0 can operate. Two terminal transistor circuits of the type described herein are known in the art exemplified by the Patent 2,655,508 which issued to L. B. Valdes on October 13, 1953.

For efficient transmission of a calling line number from the concentrator C0 to the central office, an encoding process is necessary. The encoding circuits must act on only one line at a time to avoid the transmission of false numbers. The circuit 201 provides for locking out all the lines 1L00–49 except one. Simultaneous closure of the paths to two or more of the transistors 2U0–9 cause them to start conducting. The total circuit current can, however, only increase relatively slow due to the presence of inductance of the impedance 2L0C in the common ground lead. Since the negative impedance characteristics of the transistors 2U0–9 are not identical, the total impedance around the loops of the conducting transistors is negative and loop currents flow. The current flow through one of the transistors 2U0–9 is increased and through the others decreased and finally extinguished. When the current through the impedance 2L0C reaches its final value and relay 2U0 has been operated, the voltage drop thereacross prevents any other of the transistors 2LU1–9 from conducting.

When the relay 2LU0 operates, it closes an operating path for the line tens relay 2LT0 from ground through the normal armature 2 of relay 3NTA, the normal armature 2 of relay 3TR, the winding of the originating relay 30R, the transistor 2T0, the winding of relay 2LT0 bridged by capacitor 2C10, the operated armature 0 of relay 2LU0 and the operated armature 2 of relay 2L00 to the battery 2B50. The transistors 2T0–4 which are respectively connected to the windings of relay 2LT0–4 are also connected as two terminal devices utilizing the feedback promoting resistors 2R10–14 which interconnect the respective base and emitter electrodes. The winding of the relay 30R functions as a lockout impedance so that only one of the line tens relays 2LT0–4 can operate at one time. In this manner when relay 2LU0 operates it in turn causes the operation of relay 2LT0 to complete the identification of the calling line; the operation of the transistor 2T0 to complete the lockout of the other lines 1L01–49; and the operation of the relay 30R which prepares the concentrator C0, as is hereafter described, to transmit the calling line number to the central office. The circuit 201 also assures proper association of tens and units indications in case of simultaneous requests.

The operation of relays 2LU0–9 and 2LT0–4 in the line lockout and identifier circuit 201 also provides for a translation of the registered decimal indication of the calling line to a two-out-of-four code for the tens digit and a two-out-of-five code for the units digit, in accordance with the table shown in Fig. 18. The translated identification of the calling line is supplied from the circuit 201 to the shift register 400. The operation of the line lockout and identifier circuit 201 readies paths through selected ones of the leads 4C1 and 4C2 to the associated selected ones of the nine register stages 4SR1–9 in the shift register 400. There are four leads 4C1 which provide for the tens indication and there are five leads 4C2 which provide for the units indication to the register 400. In the illustrative example described above, when the call is originated at the substation 1S00, and the units relay 2LU0 and the tens relay 2LT0 have been operated, paths are readied to the registers 4SR9, 4SR8, 4SR4 and 4SR3. The registers 4SR1–9 are connected to leads 4C1–2 through the varistors 4D1–9 which are poled in the direction of negative current from the line lockout and identifier circuit 201.

When the originating relay 30R, briefly described above, operates it in turn connects ground through its operated armature 2 to the winding of the auxiliary originating relay 30R1. The winding of relay 30R1 is also connected to battery 3V2 so that relay 30R1 operates. When relay 30R1 operates it completes the paths readied by the line lockout and identifier circuit to the shift register 400. With relays 2LU0 and 2LT0 operated, when relay 30R1 operates, the negative battery 3V3 is connected through the operated armature 3 of relay 30R1, the capacitor 3C1, the terminals of which are connected, respectively, to ground through the resistors 3R1 and 3R2, the lead 3L1 to the operated armatures 1 and 2 of relay 2LT0 and the operated armatures 5 and 6 of relay 2LU0. The operated armatures 1 and 2 of relay 2LT0 are connected through two out of four of the leads 4C1 and the varistors 4D4 and 4D3, respectively, to the shift register stages 4SR4 and 4SR3 and the operated armatures 5 and 6 of relay 2LU0 are connected through two out of five of the leads 4C2, respectively, and the varistors 4D9 and 4D8 to the shift register stages 4SR9 and 4SR8. In this manner upon the operation of circuit 201 and relay 30R1, the battery 3V3 is connected to the set terminals of stages 4SR3, 4SR4, 4SR8 and 4SR9 in the shift register 400 and the shift register 400 registers the two-out-of-four tens signals and the two-out-of-five units signals.

Each of the shift register stages 4SR1–9 includes a transistor 4T1, the base electrodes of which are connected to ground through the resistors 4R1 and 4R2. The set terminals, which are connected to the line lockout and identifier circuit 201, as described above, are connected to the junctions between resistors 4R1 and 4R2. The junctions between resistors 4R1 and 4R2 are also connected to input terminals. The input terminals of stages 4SR2–9 are each connected to the output terminals of the preceding one of the stages 4SR1–8. The input terminal of stage 4SR2, for example, is connected to the output terminal of stage 4SR1. Each of the stages 4SR1–9 is essentially a bistable trigger circuit. The input terminal of stage 4SR1, which is the input terminal for the entire register 400, for receiving serially arranged information from the central office, is connected through capacitor 4C3, and the input amplifier 4AMP1 to the normal armatures 2 and 3 of the transfer relay 3TR1. As is hereinafter described, the transfer relay 3TR1 is operated when information is transmitted from the central office to the concentrator C0. Information is registered in the stages 4SR1–9 by entering a negative pulse through either the input or the set terminals. The collector potential of the nonconducting or normal stage 4SR1, and of the stages 4SR2–9 as well, is at −24 volts due to the connection from the collector electrode through the terminal R, the operated armature 5 of relay 0R and resistor 3R4 to the battery 3V6. When the stage 4SR1 is set and transistor 4T1 is triggered, the collector potential increases to −7 volts. The collector electrode is connected to the output terminal through the resistors 4R3 and 4R4 and the 2000-microfarad capacitor 4C2. The junction between resistors 4R3 and 4R4 is connected to ground through the .05 microfarad capacitor 4C1, and the junction between resistor 4R4 and capacitor 4C2 is connected through varistor 4V1 and terminal S1 to the shift pulse generator 4GEN. Normally the 5-volt battery 4B2 in generator 4GEN maintains the junction between resistor 4R4 and capacitor 4C2 at −24 volts by reverse biasing varistor 4V1. When selected ones of the stages 4SR1–9 are set, an output is not provided to the next one of the stages 4SR1–9 because the capacitor 4C1 functions together with resistors 4R3 and 4R4 as a relay circuit. When, as is hereinafter described, shift pulses are received from the central office, all the stages 4SR1–8 are first reset and then the settings are shifted.

When relay 30R operates, in addition to causing the operation of relay 30R1, it connects the battery 3V6 through the load resistors 3R4 and the operated armatures 5 through 13 of relay 30R to the R terminals of stages 4SR1–9, as briefly indicated above, connects the D terminal of an output amplifier 4AMP2 through the operated armature 3 of relay 30R, capacitor 3C3 and the signal transformer 3TN1 to the signal leads 3D1 and 3D2 which are connected to the central office. With the shift register 400 set in accordance with the identity of the calling subscriber, and the output amplifier 4AMP2 connected to the signaling leads 3D1 and 3D2 from the output of stage 4SR9 of register 400, the concentrator C0 is set to transmit the calling line information to the central office.

When relay 30R1 operates it also applies ground through its operated armature 2 and resistor 3R6 and the lead 3BT to the central office as a signal that a call is waiting to be served. The lead 3BT is connected through the normal armature 2 of relay 6TR0 in the transfer and start circuit 600, the normal armature 7 of relay 6VGB0 and the upper winding of relay 6R0 to the battery 6B0 causing relay 6R0 to operate. The circuit 600 is part of the signal circuit 6SIG0 which is in turn part of the concentrator control 1700 indicated in the functional circuits shown in Figs. 16 and 17. The concentrator control 1700 includes the ten signal circuits 6SIG0–9, which are individually associated with the concentrators C0–9, and the control circuit 1400, the timing and connector circuit 900, the shift registers 1100 and 1101, and the translator 1000, which are common to all ten concentrators C0–9.

The operation of relay 6R0 operates the lockout circuit 1302 and provides a start signal and indication of the identity of the line link frame and vertical group to the line link marker connector 1300. The lockout circuit 1302, the connector 1300 and the other circuits shown on Fig. 13 are disclosed in the above-identified patent to Busch. When relay 6R0 operates, it provides ground through its operated armature 3 and cable 13C2 to the lockout circuit 1302. The circuit 1302 prevents false marker operation on call back calls. For call back calls, as hereinafter described, the connection to the calling line is released. The marker 1305 requires an indication from the lockout circuit 1302 in order to proceed with setting up the call.

Relay 6R0 also provides a vertical group test lead indication by providing ground through its operated armature 4 and the cable 13C1 to the line link marker connector 1300 to indicate the vertical group number or the concentrator identity. Each concentrator C0–9, as described above, replaces a vertical group. The operation of relay 6R0 also provides a start signal through its operated armatures 1 and 2 from the lockout circuit 1302 to the line link marker connector 1300. The line link marker connector 1300 functions to call in a marker 1305 to service the call originated at the substation 1S00. The operation of the armatures 1 and 2 of relay 6R0 provides to the marker 1305 a start signal and also an indication through the line link marker connector 1300 of the identity of the line link frame in which the concentrator C0 appears. Two pieces of information are therefore supplied to the marker 1305 upon the operation of one of the relays 6R0 in the start circuit 600; one is the line link frame identity and the other is the vertical group identity which is the concentrator identity. Having this information the marker 1305, over a path through the line link marker connector 1300 and cable 13C1, operates the vertical group relay 6VGA0 which corresponds to the concentrator C0 in the line link frame in which the concentrator C0 appears. Only one line link frame is represented in Figs. 1 through 14 and each line link frame would include ten concentrators C0–9.

When a marker 1305 is seized, it causes the line link marker connector 1300 to operate the vertical group relay 6VGA0 which connects the input amplifier 11AMP1 to the leads 3D1–2. The leads 3D1–2 which are individual to the concentrator C0 are connected through the transformer 6TN1 and the normal armatures 3 and 4 of relay 6TR0 to the front contacts of the armatures 1 and 2 of relay 6VGA0. When relay 6VGA0 operates it extends the connection from leads 3D1–2 through the normal armatures 1 and 2 of relay 9NT to the input terminals A and B of the input amplifier 11AMP1. The input amplifier 11AMP1 is similar to the hereinafter described output amplifier 4AMP2. The output terminal D of amplifier 11AMP1 is connected through capacitor 11C1 to the input terminal of the first stage 11SR1 of the receiver shift register 1100 which is similar to the register 400 in the concentrator C0. A signaling circuit is in this manner completed from the output terminal of the stage 4SR9 of the concentrator shift register 400 through the amplifier 4AMP2, the signal leads 3D1 and 3D2 and the amplifier 11AMP1 to the input terminal of stage 11SR1 in the receiver shift register 1100. The information, however, registered in the shift register 400 is not supplied over the signal leads 3D1 and 3D2 to the shift register 1100 until shift pulses are provided as is hereinafter described, from the central office register control circuit 1201 to the shift registers 400 and 1100.

When relay 6VGA0 operates it also provides a signaling connection through the shift leads 3S1 and 3S2 from the central office to the concentrator C0 to establish a path for supplying shift pulses to the shift register 400. The leads 3S1 and 3S2 are connected in the concentrator C0 through the transformer 3TN2 to the input terminals A and B of the amplifier 4AMP4 which is part of the shift pulse generator 4GEN. The two outputs of the generator 4GEN are connected respectively to the $S_1$ and $S_0$ terminals of the shift register stages 4SR1–9 in the register 400. The terminals $S_0$ are connected to the emitter electrodes of the transistors 4T1 and, as described above, the terminals $S_1$ are connected to the varistors 4V1. The central office ends of the leads 3S1 and 3S2 are connected through the transformer 6TN2, the secondary of which has one terminal grounded, the normal armature 5 of relay 6TR0, the now operated armature 3 of relay 6VGA0, the normal armature 4 of relay 9NT to the output terminal D of the amplifier 12AMP which is part of the register control circuit 1201. The input terminal A of the amplifier 12AMP, which is also similar to amplifier 4AMP2, is connected to the output of the shift register oscillator 12OSC which provides thereto nine shift pulses under control of the binary stages 12BC1–4 as is hereinafter described.

When relay 6VGA0 operates, it also causes the operation of the shift register relay 14SRA in the common control circuit 1400 to connect the translator circuit 1000 to the receiver shift register 1100. The operating path for relay 14SRA is from ground through the operated armature 6 of relay 6R0, the operated armature 5 of relay 6VGA0, the normal armature 1 of relay 9NT and the winding of relay 14SRA to the battery 14B5. When relay 14SRA operates it connects the windings of the nine translator relays 10A0, 10A1, 10A2, 10A4, 10B0, 10B1, 10B2, 10B4 and 10B7 in the translator 1000 through the operated armatures 1 through 9, respectively, of the relay 14SRA ot the terminals R of the shift register stages 11SR1–9. The stages 11SR1–9 are similar to the stages 4SR1–9 described above so that the terminals R are connected to the collector electrodes of the shift register transistors.

When relay 14SRA operates it in turn causes the operation of the shift register relay 14SRB by connecting ground through its operated armature 10 to the winding of relay 14SRB which is connected to the battery 14B18.

When relay 14SRB operates it opens the operating path through its normal armature 2 for the register timer relay 14RT, which is connected to the battery 14B6, to ready operating paths in the translator 1000. When relay 14SRB operates it also provides a connection from the battery 14B19 through the operated armature 11 of relay 14SRA, the operated armature 1 of relay 14SRB to the register control circuit 1201. Due to the effect of battery 12B1 which is connected across the capacitor 12C1 through the resistors 12R1 and 12R2, respectively, the potential applied to the binary counter stages 12BC1–4 in the register control circuit 1201 is approximately +15 volts. The +15 volt potential applied to the binary counter stages 12BC1–4 upon the operation of the relays 14SRA and 14SRB restores any of the operated ones of the binary counter stages 12BC1–4. The binary counter stages 12BC1–4 together with the oscillator 12OSC and amplifier 12AMP are part of a register control circuit 120 which as described above supplies nine shift pulses to the receiver shift register 1100 and to the concentrator shift register 400.

The four binary counter stages 12BC1–4 are similar with the stages 12BC1–3 additionally including a coupling circuit consisting of the resistors 12R6 and 12R3, the —5 volt battery 12B2, the varistor 12V2 and the capacitor 12C2. Stages 12BC1 and 12BC4 also have a varistor 12V5. All the other components, hereinafter described, in the counter stages 12BC1–4 are identical. The +15 volt potential supplied from the capacitor 12C1 under control of circuit 1400 is applied through the varistors 12V1 in each of the stages 12BC1–4 to the base electrodes of the transistors 12T1. The positive potential applied to the base electrodes of transistors 12T1 initiates the application of a positive potential to the oscillator 12OSC for a duration of nine oscillations thereof. At the termination of the nine oscillations of the oscillator 12OSC the positive operating potential from the binary counter stages 12BC1–4 is removed and the binary counter stages 12BC1 and 12BC4 are in their operated conditions with the binary counter stages 12BC2 and 12BC3 in their normal or non-operated conditions.

When the positive 15-volt restoring potential is applied in the register control circuit 1201 the binary counter stages 12BC1 and 12BC4 which remained operated after the prior utilization of the circuit 1201 are restored to normal. The binary counter stages 12BC2 and 12BC3 do not change their conductive conditions and remain non-operated or normal. The binary counter stage 12BC1, which is described by way of example, includes two transistors 12T1 and 12T2. The base electrodes of the transistors 12T1 and 12T2 are connected respectively through the resistors 12R8 and 12R9 to ground and their collector electrodes are connected respectively through the resistors 12R11 and 12R12 to the —24 volt batteries 12B4 and 12B5. The term operated condition of the binary counter stage 12BC1 refers to the condition of transistor 12T1 being conductive and transistor 12T2 being non-conductive conditions. The input terminal is connected gether with the associated circuitry in the stage 12BC1 form a bistable flip-flop circuit with the application of a pulse from the oscillator 12OSC to the input terminal causing the transistors 12T1 and 12T2 to reverse their conductive conductions. The input terminal is connected through the capacitor 12C3 and varistor 12V2 to the base electrode of transistor 12T1 and through the capacitor 12C4 and varistor 12V3 to the base electrode of the transistor 12T2. When the binary counter stage 12BC1 is in its normal or restored condition, and transistor 12T1 is non-conducting, its collector potential is at approximately —23 volts whereas the collector potential of transistor 12T2 is at approximately —7 volts. The base electrode of the transistor 12T2 is at substantially the same potential as its collector electrode whereas the base electrode of transistor 12T1, which is non-conducting, is at approximately 0 potential. The varistor 12V2 is therefore reversed-biased whereas the varistor 12V3 is forward-biased. The positive pulse from the oscillator 12OSC to the base electrode of transistor 12T2 causes the transistor 12T2 to become non-conducting and thereby the transistor 12T1 to become conducting.

The collector electrode of transistor 12T1 is connected through the resistor 12R6 and the varistor 12V6 to the output terminal and the collector electrode of transistor 12T2 is connected through the capacitor 12C2 and varistor 12V6 to the output terminal. When, as is hereinafter dscribed, the transistor 12T2 becomes conducting a positive pulse is provided through the capacitor 12C2 and varistor 12V6 to the output terminal. When, however, the transistor 12T1 becomes conducting the positive pulse from the collector electrode 12T1 is connected through the resistor 12R6 and the capacitor 12C2 which reverse-biases the varistor 12V6 due to the connection from the battery 12B2 through the resistor 12R12 thereto. When the transistor 12T1 becomes conducting therefore a pulse is not provided to the next stage. The collector electrode of the transistors 12T2 in the stages 12BC1 and 12BC4 but not in the stages 12BC3 and 12BC2 are connected through the varistors 12V5 to the oscillator 12OSC. Whenever one of the binary counter stages 12BC1–3 returns from its operated condition, to its normal condition with transistor 12T2 begin operated, a positive potential is provided to its next adjacent stage. When stages 12BC1 and 12BC4 become normal, a potential is provided to the oscillator 12OSC.

The chart in Fig. 19 illustrates the operation of the binary counter stages 12BC1–4 upon the application of the restoring potential from the common control circuit 1400. A "1" indicates the operated condition of the respective one of the binary counter stages 12BC1–4 and a "0" indicates a normal or restored condition. When the restoring potential is provided from the common control circuit 1400 the binary counter stages 12BC1 and 12BC4 are restored from their operated to their normal conditions. Both of these stages then provide a positive potential through their varistors 12V5 to the oscillator 12OSC. The input to the oscillator 12OSC is connected to the emitter electrode of the oscillator transistor 12T3 through the resistor 12R16 and to the battery 12B7 through the resistor 12R17. The emitter electrode transistor 12T3 is also connected through the timing capacitor 12C5 to ground and the collector electrode is connected to the battery 12B8 through the resistor 12R18. The base electrode of transistor 12T3 is connected to the —15 volt battery through the resistor 12R15. The output from the oscillator 12OSC is from the collector electrode of transistor 12T3, to the amplifier 12AMP briefly described above, to the pulse generator 11GEN1, and to the input terminal of the binary counter stage 12BC1.

When the relatively positive potential is supplied from the stages 12BC1 and 12BC4 to the emitter electrode of transistor 12T3, the transistor 12T3 commences to oscillate at a kilocycle rate, and provide pulses to the amplifier 12AMP, to the binary counter stage 12BC1 and to the pulse generator 11GEN1. The first pulse from the oscillator 12OSC causes the binary counter stage 12BC1 to change from its normal to its operated condition with the transistors 12T1 and 12T2 reversing their conductive conditions. When transistor 12T2 becomes non-conducting it removes the operating potential from the oscillator 12OSC which however remains oscillating due to the operating potential supplied from the binary counter stage 12BC4. As shown in Fig. 19 under Pulse 1, after the first pulse from the oscillator 12OSC, the stage 12BC1 is in its operated or "1" condition and the stages 12BC2–4 are in their normal or "0" conditions. The second pulse from the oscillator 12OSC causes the binary counted stage 12BC1 to return to its normal condition, apply an operating potential to the stage 12BC2 and restore the application of the oscillator operating potential. After the second pulse, as shown in Fig. 19, the stage 12BC2 is in its operated condition and the other three stages are in their normal conditions. The oscillator 12OSC continues to operate in this manner with the binary counter stages 12BC1–4 changing their conductive conditions until both the stages 12BC1 and 12BC4 assume their operated conditions. This situation occurs after the application of the ninth pulse from the oscillator 12OSC to the binary counter stage 12BC1. With both of the stages 12BC1 and 12BC4 being operated an operating potential is not provided to the oscillator 12OSC which stops oscillating. The register control circuit 1201 remains in this condition with the binary counter stages 12BC1 and 12BC4 being operated and the binary counter stages 12BC2 and 12BC3 being normal until the next restoring pulse is provided from the common control circuit 1400.

The output terminal D of the amplifier 12AMP is connected through the normal armature 4 of relay 9NT, the operated armature 3 of relay 6VGA0, the normal armature 6TR0 to the grounded winding of the transformer 6TN2. The other winding of the transformer 6TN2 is connected through the leads 3S1 and 3S2 and the transformer 3TN2 at the concentrator C0 to the input terminals A and B of the amplifier 4AMP4 in the shift pulse generator 4GEN. The output terminal of the amplifier 2AMP4, which is similar to the hereinafter described amplifier 4AMP2, is coupled through the capacitor 4C7 to the terminal C of the amplifier 4AMP3, which is also similar to the amplifier 4AMP2, and through the capacitor 4C6 and the varistor 4V6 which is shunted by the resistor 4R10 to the grounded winding of the transformer 4TN2. The other winding of the transformer 4TN2 is shunted by the varistor 4V5 and connected at one end to the battery 4B3 and at the other end to the terminals $S_0$ of the shift register stages 4SR1–9 described above. The output terminal D of the amplifier 4AMP3 is connected through the capacitor 4C5, the varistor 4V4 shunted by the resistor 4R9 to the grounded winding of the transformer 4TN1. The other winding of the transformer 4TN1 is shunted by the varistor 4V3 and connected at one end to the battery 4B2 and, at the other end, to the terminals $S_1$ of the shift register stages 4SR1–9. In this manner, the shift pulses, supplied from the register control 1201 through the leads 3S1 and 3S2, are amplified by the shift pulse generator 4GEN and supplied to the terminals $S_0$ and $S_1$ of the stages 4SR1–9. The nine shift pulses from the register control 1201 are also supplied to the shift pulse generator 11GEN1 which is similar to the shift pulse generator 4GEN. The generator 11GEN1 supplies the amplified shift pulses to the terminals $S_1$ and $S_0$ of the shift register stages 11SR1–9 in the receiver shift register 1100. The nine shift pulses supplied in this manner to the shift registers 400 and 1100 cause the digital information which is stored in the concentrator shift register 400 to be transferred through the signal leads 3D1 and 3D2 to the receiver shift register 1100 in the central office.

The shift register generator 4GEN supplies a negative pulse to the terminals $S_0$ to cause all of the shift register stages 4SR1–9 to return to their off, or non-conducting, state. Approximately 15 microseconds later the shift register generator 4GEN supplies a pulse to the terminals $S_1$ of the stages 4SR1–9. If a stage had been non-conducting prior to the application of the pulse through terminal $S_0$ its respective .05 microfarad capacitor 4C1 would have been charged to —24 volts. The —24 volt potential of capacitor 4C1 would be sufficient to reverse the bias to the varistor 4V1 to prevent the pulse through the terminal $S_1$ from passing through to the output terminal. If, however, the stage had been conducting previously to the application of the shift pulses, its .05 microfarad capacitor 4C1 would have been charged to —7 volts. When the pulse is applied by the generator 4GEN through the terminal $S_1$, an insufficient bias is present on the varistor 4V1 to maintain it reverse-biased and the negative pulse is transmitted through the 2000 micro-microfarad capacitor 4C2 to the input terminal of the succeeding stage causing it to be conducting. Subsequent pulses through the terminals $S_0$ and $S_1$ of the stages 4SR1–9 continue the shifting process.

The output terminal of the last shift register stage 4SR9 is connected to the input terminal C of the output amplifier 4AMP2 as described above. The input terminal A of amplifier 4AMP2 is connected through capacitor 4C9 to the emitter electrode of the transistor 4T2. The emitter electrode and collector electrode are connected respectively through the resistors 4R6 and 4R5 to the battery 4B1 and the base electrode is connected through the resistor 4R8 to ground. Two other input terminals B and C are provided for the amplifier 4AMP2. The terminal B, which is coupled to ground through the capacitor 4C4, is connected to the base electrode of transistor 4T2 through the resistor 4R7 and to the emitter electrode of transistor 4T2 through the varistor 4V2. The terminal C is directly connected to the base electrode of transistor 4T2. A positive pulse to the terminal A or a negative pulse to the terminal B or C is amplified through the amplifier 4AMP2. A balanced input may be applied to the terminals A and B, as for example the input to the amplifier 4AMP4 in the generator 4GEN in order to obtain greater sensitivity. The input terminal C is utilized for the amplifier 4AMP2 and 4AMP3 in order to permit negative triggering, which was briefly described above.

The output terminal D of the amplifier 4AMP2 is connected also as described above through the operated armature 3 of relay 30R, the capacitor 3C3 to the grounded winding of transformer 3TN1. The other winding of transformer 3TN1 is connected through the signal leads 3D1 and 3D2, the transformer 6TN1, the normal armatures 3 and 4 of the relay 6TR0, the operated armatures 1 and 2 of the relay 6VGA0, the normal armatures 2 and 3 of the relay 9NT to the input terminals A and B of the amplifier 11AMP1. The output terminal D of the amplifier 11AMP1, which is also similar to the amplifier 4AMP2 as described above, is coupled through the capacitor 11C1 to the input terminal of the shift register stage 11SR1. The two shift registers 400 and 1100 are therefore connected so that the output from the register 400 is supplied to the input of the register 1100. As the shift pulses are applied to both registers 400 and 1100 in synchronism the information registered in the shift register 400 is transferred step-by-step into the shift register 1100. Since the number of pulses is equal to the number of shift register stages in both registers 400 and 1100, after the ninth pulse the information in the register 1100 corresponds identically with that originally stored in the register 400.

As briefly described above the terminals R of the shift register stages 11SR1–9 are connected through the operated armatures 1 through 9 of relay 14SRA to the windings of the relays 10A0, 10A1, 10A2, 10A4, 10B0, 10B1, 10B2, 10B4 and 10B7 in the translator 1000. These relays are each shunted by the serially connected resistors 10R1 and capacitors 10C1 and are connected respectively to the batteries 10D1. As the shift register stages 11SR1–9 are operated and returned to normal during the shifting sequence of operation described above, the translator relays may operate and release in accordance therewith. As the translator relays operate they connect the winding of the associated ones of the relays 10A'0, 10A'1, 10A'2, 10A'4, 10B'0, 10B'1, 10B'2, 10B'4 and 10B'7 to the back contact of the timing relay 14RT briefly described above. The relay 14RT was released upon the operation of the relay 14SRB. The release time of relay 14RT, however, is greater than the time required for the shifting operation so that none of the 10A' or 10B' relays are operated. When, however, relay 14RT finally releases it closes ground through the operated ones of the armatures associated with the translator relays 10A0, 10A1, 10A2, 10A4, 10B0, 10B1, 10B2, 10B4 and 10B7 to the windings of the associated relays 10A'0, 10A'1, 10A'2, 10A'4, 10B'0, 10B'1, 10B'2, 10B'4 and 10B'7.

In the illustrative example described herein the call is originated at the substation 1S00 and the shifting sequence of operation terminates with the stages 11SR3, 11SR4, 11SR8 and 11SR9 in register 1100 being operated as indicated on the chart shown in Fig. 18. When relay 14RT releases the translator relays 10A2, 10A4, 10B4 and 10B7 are therefore operated and in turn cause the operation of their associated relays 10A'2, 10A'4, 10B'4 and 10B'7 which are connected to individually associated batteries 10D2.

Two of the four relays 10A'0, 10A'1, 10A'2 and 10A'4 operate to indicate the tens digits or vertical files 0 through 5. In a similar manner, two out of five of the relays 10B'0, 10B'1, 10B'2, 10B'4 and 10B'7 operate to indicate one of the ten line units digits 0 through 9 as a horizontal group indication. In this manner the operation of the translator circuit 1000 performs a translation from the two-out-of-four and two-out-of-five coded information from the concentrator C0 to a decimal code. When relays 10A′2, 10A′4, 10B′4 and 10B′7 operate, an operating path is connected for the checking relay 14CK in the common control circuit 1400. The operating path for relay 14CK is from ground through the operated armature 1 of relay 10A′4, the operated armature 2 of relay 10A′2, the normal armature 2 of relay 10A′1, the normal armature 1 of relay 10A′0, the normal armature 1 of relay 10B′0, the normal armature 1 of relay 10B′1, the normal armature 1 of relay 10B′2, the operated armature 1 of relay 10B′4, the operated armature 1 of relay 10B′7, the normal armature 6 of relay 9NT and the winding of relay 14CK to battery 14B15. Relay 14CK operates only when two of the A′ relays and two of the B′ relays operate. If more or less of these relays operated, an operating path is not provided for relay 14CK. When relay 14CK operates it connects ground through its operated armature 1, the normal armature 2 of relay 10A′0, the normal armature 4 of relay 10A′1, the operated armature 5 of relay 10A′2, the operated armature 3 of relay 10A′4 and the lead designated 0 to the line link connector as an indication that the tens digit is 0. Upon the operation of relay 14CK ground is also connected through its operated armature 2, the normal armature 3 of relay 10B′0, the normal armature 6 of relay 10B′1, the normal armature 7 of relay 10B′2, the operated armature 8 of relay 10B′4, the operated armature 7 of relay 10B′7 and the lead designated 0 through cable 13C1 to the line link marker connector 1300 as an indication that the units digit of the calling line is 0. The decimal indications are passed from the connectors 1301 and 1300 to the marker 1305 as vertical file and horizontal group indications, respectively.

The identity of the line units digit is, in this manner, provided as a horizontal group indication through the line link marker connector 1300 to the marker 1305 and the line tens digit is provided as the vertical file indication through the line link connector circuit 1301 to the marker 1305. The marker 1305 now has the line link frame identification, the vertical group or concentrator identification, the horizontal group or line units identification and the vertical file or line tens identification.

When the marker 1305 has obtained this information and connected to the line link frame, which includes the control circuit 1700, it operates the common control circuit 1400 in accordance with the vertical file and horizontal group information received from the translator circuit 1000 and also selects one of the trunks 3T0–9. The marker 1305 operates one of the ten horizontal group relays 14HG0–9 and one of the five vertical file relays 14VF0–4 in accordance with the horizontal group and vertical file information over a path through the line link connector 1301. At the same time that one of the horizontal group relays 14HG0–9 and one of the vertical file relays 14VF0–4 in the common control circuit 1400 are operated, the marker 1305 operates one of the ten vertical group preference relays 6VGP0–9 in the start circuits 600 and the relay 14D in the circuit 1400. In the illustrative example described herein, the relays 14HG0, 14VF0 and 6VGP0 are operated. Relay 11VF0 is operated from the line link connector 1301 over a path through the winding of relay 14VF0 to battery 14B1; relays 14HG0 and 6VGP0 are operated over a path from ground through their respective windings over a path to the line link connector 1301. The operation of relay 6VGP0 indicates that the call being serviced is from or to a substation connected to concentrator C0 and the operation of relays 14HG0 and 14VF0 indicates the identity of the substation.

Relay 14D is operated over a path from the line link connector 1301 through cable 13C3, the lead designated D and the winding of relay 14D to battery 14B7. When relay 14D operates it connects ground through the normal armature 10 of relay 9NT, the operated armature 4 of relay 6VGA0 and the locking armature 5 of relay 6R0. Relay 6R0 was locked operated as described above upon the operation of relay 14CK. Relay 14D provides the additional locking ground to maintain relay 6R0 operated so that the line location information is provided to the line link marker connector 1300. Relay 6R0 was originally operated over a path through the lead 3BT which is one of the six leads connecting the concentrator C0 to the central office. It is necessary to provide this locking ground because the lead 3BT will be used as as hereinafter described to obtain a crosspoint closure indication when a connection is established between the calling line 1L00 and a selected one of the trunks 3T0–9 at the concentrator C0.

Since the marker 1305 has received from the concentrator C0 all the information necessary for setting up the call and recorded this information in the common control circuit 1400 and signal circuit 6SIG0, the leads 3D1–2 which were utilized for receiving this information from the concentrator C0 can now be used for setting up the connection thereat. When relay 6VGP0 is operated, it in turn, causes relay 6VGB0 to operate over a path from ground through its winding, the operated armature 2 of relay 6VGP0, and the serially connected normal armatures 4 of the relays 8TP0–9 to the battery 18B9. If any one of the ten relays 8TP0–9 is operated at this time the relay 6VGB0 does not operate and central office-to-concentrator signals, hereinafter described, are delayed. One of the relays 8TP0–9 will be operated, as hereinafter described, during disconnect so that if a disconnect sequence of operations is taking place and one of the relays 8TP0–9 is operated, servicing of the originating call from one of the subscribers' lines connected to the concentrator C0 is halted or delayed. In a similar manner also as hereinafter described, if the relay 6VGB0 is first operated, the operation of the relays 8TP0–9 does not occur and the disconnect sequence of operation is delayed.

The operation of the relay 6VGB0 causes the operation of relay 6TR0 in circuit 600 and relay 3TR0 in circuit 300 in concentrator C0. Relays 6TR0 and 3TR0 are serially operated over a path from battery 14B12 through a varistor 14V1, the normal armature 5 of relay 9CB, the operated armature 3 of relay 14VF0, the operated armature 5 of relay 14HG0, the operated armature 2 of relay 6VBG0, the winding of relay 6TR0 in the circuit 600, the lead 3TR, the winding of the relay 3TS, the winding of relay 3TR0 and the normal armature 3 of relay 3NTA to ground. The relays 6TR0 and 3TR0 are, therefore, serially operated upon the operation of relays 14HG0, 14VF0 and 6VGB0. The relay 3TS is a marginal relay and does not operate at this time.

The operation of the relays 6TR0 and 3TR0 causes the shift registers 1101 and 400 to transfer the line number indication on a two-out-of-four and two-out-of-five signaling basis to the concentrator C0.

When relay 3TR0 operates it opens at its armature 2, the operating path for relays 2LV0 and 2LT0, causing them to release.

When relays 2LV0 and 2LT0 release the selective paths through leads 4C1 and 4C2 to the register 400 are opened. When relay 6TR0 operates it also transfers the lead 3BT through its operated armature 2 to the winding of the line busy relay 9LB; transfers the leads 3D1–2 through its operated armature 4 to the output terminal D of the amplifier 11AMP2; transfers the shift leads 3S1–2 through its operated armature 5 to the output of the register control 1201; and causes the operation of the relay 14TRA by connecting ground thereto through its operated armature 6. When relay 14TRA operates it connects the terminal R of each shift register stage 11TSR1–9 of the transmitter shift register 1101 through its operated armatures 1 through 9, respectively, and the resistors 14R1–9 to the battery 14B8 and also causes the operation of relay 14TRB by connecting ground through its operated armature 10 to the winding thereof. The other terminal of the winding of relay 14TRB is connected to the battery 14B20. When relay 14TRB operates it applies a pulse from battery 14B10 through its operated armature 1 to the register control circuit 1200 which is similar to the register control circuit 1201 to restore it for the nine shift pulse sequences described above in reference to the register control 1201. Relay 14TRB also opens the operating circuit of the output timer relay 14OPT which is connected to battery 14B14. Relay 14OPT is a slow-to-release relay which when released connects the battery 14B13 to the lead 3TR to cause the relay 3TS to operate. Relay 14OPT does not release until after the central office-to-concentrator signaling operation is completed. When relay 14TRB operates it also applies a pulse from battery 14B11 through its operated armature 2 and the capacitor 14C2, the terminals of which are grounded by the resistors 14R10 and 14R11 to the armature 4 of relay 14VF0 and the armatures 8 and 7 of the relay 14HG0. As described above relays 14VF0 and 14HG0 have been operated under control of the marker 1305. The operated armatures 4 and 5 of relay 14VF0 are connected respectively to the shift register stages 11TSR3 and 11TSR4 and the operated armatures 7 and 8 of relay 14HG0 are connected respectively to the shift register stages 11TSR8 and 11TSR9. The application of the negative pulse from battery 14B11 sets the shift register 1101 in accordance with the information registered in the common control circuit 1400.

The register control 1200 provides nine shift pulses to the pulse generator 11GEN2 and to the shift leads 3S1–2. The pulse generator 11GEN2 is similar to the pulse generator 4GEN described above in the concentrator C0 and is connected to the shift register stages 11TSR1–9 so that the information registered therein is shifted through the amplifier 11AMP2 and the signal leads 3D1–2 to the concentrator C0.

In the concentrator C0 the operation of relay 3TR0 in the circuit 300 causes the release of circuit 201, of the relay 30R and in turn the release of the relay 30R1. When relay 30R releases it removes the battery 3V6 from the terminal R of each of the stages 4SR1–9 resetting or returning them to normal. When relay 30R releases it also connects the winding of relay 3TR1 which is connected to battery 3V8 through the normal armature 1 of relay 30R and the operated armature 1 of relay 3TR0 to ground. When relay 3TR1 operates it connects the windings of the register relays 3A0, 3A1, 3A2, 3A4, 3B0, 3B1, 3B2, 3B4 and 3B7 through its operated armatures 4 through 12 to the terminals R of the shift register stages 4SR1–9. None of these relays however operates until the shift register stages are operated under control of the digital information through leads 3D1–2 from the central office.

The shift pulses from the central office through leads 3S1–2 are connected through the transformer 3TN2 and the shift pulse generator 4GEN to the concentrator shift register 400 and the digital information through leads 3D1–2 is connected through the transformer 3TN1, the operated armatures 2 and 3 of relay 3TR1, the input amplifier 4AMP1 and capacitor 4C3 to the input terminal of the shift register stage 4SR1. The input amplifier 4AMP1 is similar to the output amplifier 4AMP2 described above. In this manner the digital information is serially pulsed on a two-out-of-four basis for the tens digit and a two-out-of-five basis for the units digit to the shift register 400. As the information is entered to the shift register stage 4SR1 the shift pulses are provided through the generator 4GEN to shift or transfer the information step by step to the succeeding stages 4SR2–9. At the end of the nine shift pulses the information that was in the transmitter shift register 1101 has been transferred to the shift register 400.

After the information has been shifted the relay 14OPT described above in the common control circuit 1400 releases and connects the battery 14B13 through its normal armature, the operated armature 4 of relay 14TRB, the normal armature 5 of relay 9CB, the operated armature 3 of relay 14VF0, the operated armature 5 of relay 14HG0, the operated armature 2 of relay 6VGB0, the winding of relay 6TR0, lead 3TR, the windings of relays 3TS and 3TR0 and the normal armature 3 of relay 3NTA to ground. Relays 3TR0 and 6TR0 were operated over this path from battery 14B12 as described above. The application of battery 14B13 upon the release of relay 14OPT to the lead 3TR causes the marginal relay 3TS to operate. When relay 3TS operates it connects ground to the contact networks of the register relays in the circuit 300. With the tens and units digits being 0 at the completion of the shifting sequence of operations the shift register stages 4SR3, 4SR4, 4SR8 and 4SR9 are operated. With the shift register stages 4SR3, 4SR4, 4SR8 and 4SR9 being operated the relays 3A2, 3A4, 3B4 and 3B7 which are associated respectively therewith are operated. The ground supplied from the operated armature of relay 3TS is connected through the normal armature of relay 3A0, the normal armature 1 of relay 3A1 and the operated armatures 1 of relays 3A2 and 3A4 to the winding of the relay 1E0 and through the normal armature of relay 3B0, the normal armatures 1 of relays 3B1 and 3B2 and the operated armatures 1 of relays 3B4 and 3B7 to the winding of relay 1U0. The relays 1E0–4 and 1U0–9 are in the number group circuit 1NG which controls the operation of the trunk circuits 1T0–9. One of the relays 1E0–4 and one of the relays 1U0–9 are operated upon the operation of two of the A relays and two of the B relays in the circuit 300 to provide for a translation to a decimal code. The contacts of the number group relays 1E0–4 and 1U0–9 are used to make busy tests by readying an operating path for the line busy relay 9LB and to control the operation of the trunk circuits 1T0–9 which are used to establish a connection between one of the trunks 3T0–9 and the calling subscriber's line 1L00.

A rapid signaling sequence is utilized from the central office to the concentrator to reduce the marker holding time necessary for establishing line-to-trunk connections. Marker holding time is an expensive item in crossbar telephone systems due to the cost of a marker 1305. In fact, marker holding is generally valued at more than sixty dollars per millisecond per marker. The number of markers 1305 that is utilized in a marker group depends upon the number of lines and the marker holding time for servicing a call. The marker holding time for obtaining dial tone or for establishing a line-to-register connection in the No. 5 crossbar system described in the above-identified patent to Busch is approximately four-tenths of a second. If the signaling system from the central office to the concentrator C0 were to take 30 or 40 milliseconds, it would increase the marker holding time 10 percent or increase by at least 10 percent the number of markers 1305 needed in a marker group.

The rapid sequence signals cause the concentrator C0 to operate approximately 6 milliseconds after the selection of trunk 3T0 by the marker 1305 which results in a relatively small increase in marker holding time. Most of the signaling takes place during the time that the marker 1305 utilizes to select one of the trunks 3T0–9.

Another factor in determining the use of the rapid sequence signaling from the central office in addition to marker holding time is the desire to restrict the number of control leads. The more control leads that are utilized the less the savings in copper. The six control leads 3BT, 3TR, 3D1–2, 3S1–2 not only provide for signaling the calling line identity but also for service request indications, line busy indications, trunk identification during no-test calls, etc.

At the same time that the marker 1305 was connected to the line link frame in which the concentrator C0 appeared and operated the vertical group relay 6VGB0, it also obtained access to the leads 10LL0–9 for selecting an idle line or trunk 3T0–9 to be used in setting up the call. When the marker 1305 selects an idle link which is indicated by the absence of ground on the corresponding one of the leads 10LL0–9 it proceeds to connect a source of potential, not shown, to the associated one of the select magnets 9SM0–9 and applies ground to one of the hold magnets 8HM0–9. Ground is applied to operate one of the hold magnets 8HM0–9 connected to the associated batteries 8B20–29 to connect, upon the operation of one of the select magnets 8SEL0–9, the horizontals of the frame 8LLF to the trunk frame 1303. For example, when the marker 1305 selects the idle link or trunk 3T9 after determining in the absence of ground upon lead 6LB9 that it is idle, it connects a source of potential through the line link connector 1301, the winding of the select magnet relay 9SM9 through the normal armature 19 of the relay 9XSM to ground causing the relay 9SM9 to operate. Immediately thereafter, the marker 1305 applies ground through the line link connector 1301 to one of the line hold leads 11LH0–4 to operate the line hold relay 9LH in the connector circuit 900. In the No. 5 crossbar system of the type disclosed in the above-identified patent to Busch, there is one line hold relay for each vertical file so that ordinarily five line hold relays would be utilized. In the concentrator control circuit 1400, however, the leads 14LH0–4 are grouped together after passing through armature 1 of the vertical file relays 14VF0–4 and are used to operate the common line hold relay 9LH. Only one line hold relay 9LH is needed because only one call at a time is handled by the concentrator control 1700. It is used as an indication that the marker 1305 is ready to complete the link to junctor connection. In the illustrative example described above, the originating call identifying number is 00 so that the marker 1305 applies ground to the lead 14LH0 in accordance with a vertical file indication of 0. The lead 14LH0 is connected through the operated armature 1 of relay 14VF0, the normal armature 2 of the line busy relay 9LB and the winding of relay 9LH to the battery 9B3.

When the relay 9SM9 operates, it in turn causes the operation of the select magnet 8SEL9 which is a part of the crossbar switch or line link frame generally designated as 8LLF in the trunk control circuit 800. The operating path for the select magnet 8SEL9 is from ground through the winding of the magnet 8SEL9, the operated ninth armature E of relay 6VGB0, the operated armature 2 of relay 9SM9 and the lamp 9L1 to the battery 9B3. The leads from the windings of the other select magnets 8SEL0–8 are connected in parallel through back contacts of the associated select magnet relays 9SM0–8 to the winding of the relay 9XSM. A cross between two leads will cause the relay 9XSM to operate and apply battery to the leads 9S0–9 to the marker 1305 but not to the lead 14S9 to provide a trouble indication to the marker 1305. The crossed select magnet relay 9XSM operates to provide an indication from battery 9B3 through the resistor lamp 9L1, the operated armature 1 of relay 9XSM, the nine normal armatures 5 of relays 9SM0–8, leads 9S0–8, and the line link connector 1301 to the marker 1305.

When the marker 1305 causes the operation of the relays 9LH and 9SM9 in circuit 900, a path is completed for operating the trunk preference relay 8TP9 in the control circuit 800. The operating path for the relay 8TP9 is from ground at the normal armature 1 of the line busy relay 9LB through the operated armature 3 of relay 9LH, the operated armature 6 of relay 9SM9, the operated ninth armature A of relay 6VGB0 through the upper winding of relay 8TP9 to the associated battery 8B9. The operation of the trunk preference relay 8TP9 connects a positive high voltage potential source 8B19 through the resistors 8R90 and 8R91 and the operated armatures 1 and 2 of the relay 8TP9 over both sides or leads of the trunk 3T9 to the concentrator C0.

Each one of the trunks 3T0–9 has, as described above, associated therewith one of the trunk circuits 1T0–9 which functions to provide a connection between any one of the trunks 3T0–9 and any one of the subscribers' lines 1L00–49. The ring lead of the trunk 3T9 is connected through the resistor 1G9 to the main anode of the triode gaseous tube 1CA9 in the trunk circuit 1T9. The tip lead of the trunk 3T9 is connected to the starting anode of the tube 1CA9 and to ground through the series circuit consisting of the resistor 1AA9 and the capacitor 1CC9. The main anode of tube 1CA9 is shunted to ground through the capacitor 1C9, and the cathode of tube 1CA9 is connected through the winding of the trunk relay 1TK9 to ground. The capacitor 1C9 filters high frequencies to prevent false operation. The application of the positive potential from source 8B19 in the central office control circuit 1800 to trunk 3T9 causes the cold cathode tube 1CA9 to ionize and the trunk relay 1TK9 to operate. The combination of the operation of one of the trunk relays 1TK0–9 together with one of the relays 1E0–4 and one of the relays 1U0–9 in the number group circuit 1NG, which were operated as described above, provides a path for operating one of the relays 1TE90–94 and one of the relays 1TU90–99 in the trunk circuit 1T9. With relays 1TK9, 1E0 and 1U0 operated, operating paths are completed for relays 1TU90 and 1TE90 in the trunk circuit 1T9. The operating path for relay 1TU90 is from ground through the operated armature 1 of relay 1TK9, the operated armature 9 of relay 1U9 and the winding of relay 1TU90 to battery 1A90 and the operating path for relay 1TE90 is from ground through the operated armature 2 of relay 1TK9, the operated armature 9 of relay 1E0 and the winding of relay 1TE90 to battery 1D90.

There is only one set of relays 1E0–4 and 1U0–9 but there are ten sets of corresponding relays in the trunk circuit 1T0–9. In the illustrative example described herein with the selection of the trunk 3T9 by the marker 1305, relay 1TK9 is operated and the relays 1E0 and 1U0 which indicate a subscriber's number 00 corresponding to the substation 1S00 are operated to provide for a path between the selected trunk 3T9 and the calling line 1L00. The path from the tip lead 1T00 is through the operated armatures 1 of relays 1TU90 and 1TE90 to the tip lead of the trunk 3T9 and the path from the ring lead 1R00 is through the operated armatures 2 of relays 1TU90 and 1TE90 to the ring lead of the trunk 3T9. The operation of the relays 1TU90 and 1TE90 also provides a path for operating the cut-off relay 2C00 in the line circuit 200 in series with the varistor shunted winding of the no-test relay 2NT9. The operating path is from ground through the shunting varistor 2V9, the operated armature 6 of relay 1TU90, the operated armature 10 of the relay 1TE90 and the winding of relay 2C00 to the negative potential source 2X00. The relay 2NT9 does not operate at this time due to the effect of the varistor 2V9 which prevents it from operating upon connection to a negative source of potential. The cut-off relay 2C00–49 in the line circuit 200 are associated respectively with the subscriber lines 1L00–49 and as hereinafter described there is one no-test relay 2NT0–9 for each of the trunks 3T0–9.

When relay 2C00 operates, it releases the line relay 2L00.

When the number group relays 1E0 and 1U0 operated, a path was readied for the line busy relay 9LB, as briefly described above, by connecting the winding of relay 9LB over the control lead 3BT to the winding of the cut-off relay 2C00 of the calling line 1L00. When the trunk circuit 1T9 is operated and ground is applied to operate the cut-off relay 2C00, the same ground is extended to and operates the line busy relay 9LB in the circuit 900 as an indication that the line-to-trunk crosspoints are closed, or that relay 2C00 was operated. The winding of the relay 9LB which is connected to the battery 9B1 is connected through the operated armature 2 of the transfer relay 6TR0, the lead 3BT, the operated armature 10 of the relay 1E0, the operated armature 10 of relay 1U0, the operated armature 10 of relay 1TE90, the operated armature 6 of relay 1TU90 and the varistor 2V9 to ground. The operation of relay 9LB opens at its armature 1 the operating path for the trunk preference relay 8TP9 in the control circuit 800. The operating path for relay 8TP9 was through the operated ninth armature A of relay 6VGB0, the operated armature 7 of relay 9SM9, the operated armature 3 of relay 9LH through the normal armature 1 of relay 9LB to ground. When relay 8TP9 releases, it removes the source 8B19 from the trunk 3T9 causing the trunk relay 1TK9 to release and the triode 1CA9 in circuit 1T9 to return to normal. Relays 1TE90 and 1TU90 which were operated respectively through the operated armatures 1 and 2 of relay 1TK9 remain operated through the back contacts of the normal armatures 1 and 2 of relay 1TK9 and their respective operated locking armatures 5 and 3.

When the line busy relay 9LB in the central office connector circuit 900 operates, it also closes a path through the lead 14LH0 from the line link connector 1301 to the winding of the sleeve relay 8S9 in the control circuit 800 causing it to operate. The path from lead 14LH0 is through the operated armature 1 of relay 14VF0, the operated armature 2 of relay 9LB, the operated armature 1 of relay 9LH, the operated armature 3 of relay 9SM9, the operated ninth armature B of relay 6VGB0 through the winding of relay 8S9 to the associated battery 8B39. The operation of the relay 8S9 in turn causes the operation of the corresponding slow release relay 8SR9 by connecting ground through its operated armature 4 and the winding of relay 8SR9 to the associated battery 8B49. When relay 8S9 operates, it closes the link tip lead and ring lead through its operated armatures 1 and 2 and the normal armatures 1 and 2 of the relay 8TP9, to the tip lead and ring lead of trunk 3T9. The line hold lead 14LH0 which was extended through the operated armature 2 of relay 9LB as described above to the winding of relay 8S9 is extended therefrom upon the operation of relay 8S9 through its operated armature 3 to the link sleeve lead as an indication to the marker 1305 that the crosspoints are closed. When relay 8SR9 operates, it locks to ground through its operated armature 2 and the normal armature 5 of relay 8TP9 and connects the grounded resistor 8A9 through its operated armature 3, the operated ninth armature F of relay 6VGB0 and the lead 10LL9 to the line link connector 1301.

In this manner the subscriber's line 1L00 is connected through the trunk circuit 1T9, trunk 3T9 and the central office trunk control circuit 800 to the trunk frame 1303. The trunk frame 1303 is connected to an originating register 1306 under control of the marker 1305 to provide dial tone to the line 1L00.

After the marker 1305 connects the register 1306 to frame 1303, it releases and, in turn, releases all the relays shown in Figs. 1 through 14 except the relays 1TU90, 1TE90, 1E0, 1U0 and 2C00 at the concentrator C0 and the relays 8S9, 8SR9, 14RT, 14OPT and the selected one of hold magnets 8HM0–9 in the central office which remains operated for the duration of the call. When the marker 1305 releases, or disconnects, it releases relays 14HG0, 14VF0, 6VGA0, 6VGP0, 9MS9 and 9LH. When relay 6VGP0 releases, it in turn releases relay 6VGB0 and when relays 14HG0 and 14VF0 release they in turn release relays 6TR0, 3TR0, 3TS and 9LB. When relay 6VGB0 releases, it releases relay 14TRA which in turn releases the shift register 1101 and the relay 14TRB. When relay 14TRB releases, it causes the reoperation of relay 14OPT. When relay 6VGB0 releases, it also opens the operating path for select magnet 9SM9 causing it to release. The crosspoint through the frame 8LLF remains locked, however, under control of the operated one of the hold magnets 8HM0–9. When relay 6VGA releases, it opens the locking path for relay 6R0, causing it to release. When relay 6R0 releases, it in turn releases relay 14SRA. The operating path for relay 14SRA is from ground through the operated armature 6 of relay 6R0. When relay 14SRA releases it in turn releases the relay 14SRB and the translator circuit 1000 and removes the battery 14B19 from the register control circuit 1201. More specifically, when relay 14SRA releases it opens at its armatures 1 through 9 the operating paths from the receiver shift register 1100 to the windings of relays 10A2, 10A4 10B4 and 10B7 in the translator circuit 1000 causing them to release. When relays 10A2, 10A4, 10B4 and 10B7 release they in turn cause the release of the associated relays 10A'2, 10A'4, 10B'4 and 10B'7 to remove the line identification indication from the marker 1305. When the relays 10A'2, 10A'4, 10B'4 and 10B'7 release they also cause the release of the check relay 14CK. When relay 14SRB releases it recloses ground through its armature 2 to the winding of the slow operating and releasing relay 14 RT causing it to reoperate and remove the locking ground which was connected to the lower winding of the start relay 6R0.

When relay 6R0 releases it also removes the vertical group identification indication from the marker 1305 and the lockout circuit 1302.

When relay 3TR0 in the concentrator C0 releases it in turn releases the relay 3TR1 which opens the operating paths for relays 3A2, 3A4, 3B4 and 3B7 causing them to release. When the operating paths for relays 3A2, 3A4, 3B4 and 3B7 are opened the shift register 400 is returned to normal or reset. When relay 3TS releases or when relays 3A2, 3A4, 3B4 and 3B7 release, they in turn release the number group relays 1E0 and 1U0. The relays 1TU90 and 1TE90 remain operated through their locking paths and relay 2C00 remains operated through the operated armatures 6 and 10, respectively, of relays 1TU90 and 1TE90.

*Call-back call*

When dial tone is received at the substation 1L00 and the called subscriber's number is dialed, it is registered in the originating register 1306. After the dialed number is recorded in the originating register 1306 the established connection between the calling line 1L00 and the originating register 1306 is released and a new connection from the calling line 1L00 to the trunk frame 1303 to the called line, not shown, is established. When dialing is completed the originating register 1306 summons a marker 1305, passes to it the information necessary to complete the call, the calling line identification 1L00, and a record of the frame linkages used on the line-to-register connection. The marker 1305 then releases register 1306 and proceeds to establish the line-to-trunk connection after having ascertained that a linkage therefore is available.

A call-back call in conjunction with a concentrated line, such as 1L00, is somewhat more complex than one in conjunction with a regular line not connected to a concentrator, such as concentrator C0, because of the fact that the line-to-trunk connection at the concentrator C0 is locked operated and must receive a distinct release signal in order to disconnect. This connection must be released on each call-back call because the link selected to complete the line-to-trunk connection may not be the same as that used for the register connection. The marker 1305 makes use of recorded line linkages to release the line-to-register connection at the concentrator C0 before establishing the line-to-trunk connection, When the register 1306 is released the sleeve ground potential through trunk frame 1303 and the frame 6LLF is removed causing relay 8S9 to release. When the marker 1305 is ready to establish the line-to-trunk linkage it selects the line link frame in which the concentrator C0 appears and operates through connector 1301 the relays 6VGP0, 14HG0 and 14VF0 and also, as is hereinafter described, the relay 9LD9 and the call-back relay 9CB. The operation of the call-back relay 9CB in turn energizes the timing relay 9TM by applying ground through its operated armature 3 and the serially connected normal armatures 1 of relays 9LD9–0 and the winding of relay 9TM to the battery 9B5. The timing relay 9TM functions to delay the operation of the transfer relay 6TR0 in order to prevent operating the number group relays 1E0–4 and 1U0–9 in the number group circuit 1NG at the concentrator C0. The number group relays 1E0–4 and 1U0–9 must remain non-operated while the linkage in use is being released because the presence of a trunk signal alone is used to disconnect and the presence of a trunk signal in combination with the line number is used to connect a line-to-trunk circuit at the concentrator C0. The relay 9TM is utilized to control the length of time allowed for releasing the trunk circuit 1T9 in the concentrator C0. The winding of relay 9TM is connected to the duration control circuit which includes the capacitor 9C1 which is connected to ground through the resistor 9R3 and to battery 9B4 through the varistor 9V1 shunted by capacitor 9C2 and through the resistor 9R4. When the relay 9TM finally operates, it in turn causes the operation of relay 9TM1 by connecting ground through its operated armature 4 and the winding of relay 9TM1 to battery 9B6. When relay 9TM1 operates, it locks to ground through its operated armature 2 and the operated armature 1 of the call-back relay 9CB and also connects ground through its operated armature 1, the operated armature 1 of relay 9TM and the winding of relay 9TM2 to battery 9B7 causing relay 9TM2 to operate.

When the marker 1305 has determined that there is a path available to the called line or outgoing trunk from the trunk frame 1303, it releases, as described above, the originating register 1306 and at the same time operates the disconnect relay 9LD0–9 which corresponds with the link or trunk 3T0–9 that was used on the line-to-register connection. In the illustrative example described above, trunk 3T9 was utilized so that relay 9LD9 is operated over a path from the winding thereof through the line link connector 1301 to battery, not shown, in marker 1305. When relay 9LD9 operates, it causes the linkage from the line 1L00 to the originating register to be disconnected or opened at the concentrator C0. When relay 9LD9 operates, it opens at its armature 1 the operating path for the slow release timing relay 9TM and closes an operating path for relay 8TP9 in the trunk control circuit 800. The operating path for relay 8TP9 is from ground through the operated armature 3 of relay 9TM, which has not as yet released, the operated armature 2 of relay 9LD9, the operated ninth armature A of relay 6VGB0 which operated under control of relay 6VGP9, the winding of relay 8TP9 to the associated battery 8B9. When relay 8TP9 operates, it applies the positive potential source 8B19 through resistors 8R90 and 8R91 and its operated armatures 1 and 2 to the trunk 3T9 causing the ionization of the tube 1CA9 and the operation of the trunk relay 1TK9 in the trunk circuit 1T9 in a similar manner as described above for establishing the connection from the subscriber's line 1L00 to the originating register 1306. With the number group relays 1E0–4 and 1U0–9 remaining normal, the operation of the trunk relay 1TK9 removes ground from the windings of relays 1TE90 and 1TU90 causing them to release and to open the connection from the line 1L00 to the trunk 3T9.

At the end of the timed interval the relay 9TM in circuit 900 releases to in turn release the relay 8TP9, the operating path of which, as described above, was through the operated armature 3 of relay 9TM. When relay 8TP9 releases, it removes the disconnect potential from trunk 3T9. Relay 9TM also opens the operating path at its armature 1 for the relay 9TM2 causing it to release. Relay 9TM2 is also a slow-to-release relay in order to allow sufficient time for the trunk relay 1TK9 in the trunk circuit 1T9 to release. When the relay 9TM2 finally releases, with relay 9TM1 still locked operated, a circuit is completed for operating the relay 6TR0 and the transfer relay 3TR0 in the circuit 300 to permit connecting the subscriber's line 1L00 to one of the trunks 3T0–9 as selected by the marker 1305 in a similar manner as described above for establishing the line-to-register connection. The operating path is from battery 14B12 through the varistor 14V1, the operated armature 3 of relay 9TM1, the normal armature 1 of relay 9TM2, the normal armature 2 of relay 9TM, the operated armature 3 of relay 14VF0, the operated armature 5 of relay 14HG0, the operated armature 2 of relay 6VGB0, the winding of relay 6TR0, lead 3TR, the winding of relay 3TS, the winding of relay 3TR0 and the normal armature 3 of relay 3NTA to ground. Relays 6TR0 and 3TR0 are in this manner operated but the marginal relay 3TS is not. When relay 6TR0 operates, it connects ground through its operated armature 6 to the winding of relay 14TRA to initiate the signaling sequence to the concentrator C0. When relay 6TR0 operates, it in turn operates relay 14TRB and connects the battery 14B8 to ready the shift register 1101. When relay 14TRB operates, it causes the release of relay 14OPT, connects battery to reset the register control 1200 and applies a pulse through the operated armatures 4 and 5 of relay 14VF0 and through the operated armatures 7 and 8 of relay 14HG0 to set the register 1101. The circuit 1200 supplies nine shift pulses to the register 1101 and through the leads 3S1–2 to the register 400 to transfer the digital information to the concentrator C0. When relay 3TR0 in the concentrator C0 operates, it causes the operation of the relay 3TR1 to connect the windings of relays 3A0, 3A1, 3A2, 3A4, 3B0, 3B1, 3B2, 3B4 and 3B7 to the register 400. Coded signals reppresenting the identity of the calling line 1L00 are, therefore, sent under control of the circuit 1400 in a similar manner as described above for establishing a line-to-register connection to operate the transfer and register circuit 300. Relays 3A2, 3A4, 3B4 and 3B7 are operated in the circuit 300 to register the number 00 which corresponds to the calling subscriber and in turn cause, as is hereinafter described, the operation of the number group relays 1E0 and 1U0.

After the digital information has been received in the register 400, and relays 3A2, 3A4, 3B4 and 3B7 have been operated in accordance therewith, relay 14OPT in the central office finally releases to connect battery 14B13 to lead 3TR and cause the marginal relay 3TS to operate. When relay 3TS operates, it connects ground to the windings of the number group relays 1U0 and 1E0 causing them to operate.

Assume, for example, that trunk 3T0 has been selected by the marker 1305. At the same time that the marker 1305 operated the relays 14HG0, 14VF0, etc., the marker 1305 also operates the relays 9SM0 and 9LH (after the channel is selected) which in turn cause the operation of relay 8TP0. When relay 8TP0 operates, it applies an operating potential from battery 8B10 through resistors 8R00 and 8R01 and the operated armatures 1 and 2 of relay 8TP0 to the trunk 3T0 to cause tube 1CA0 to ionize and the trunk relay 1TK0 to operate. The operation of the relays 1E0, 1U0, and 1TK0 together form operating paths for the relays 1TU00 and 1TE00 in the trunk circuit 1T0 to provide a connection between the line 1L00 through trunk 3T0 to the central office. The operating path for relay 1TU00 is from ground through the operated armature 1 of relay 1TK0, the operated armature 0 of relay 1U0 and the winding of relay 1TU00 to battery 1A00 and the operating path for relay 1TE00 is from ground through the operated armature 2 of relay 1TK0, the operated armature 0 of relay 1E0, and the winding of relay 1TE00 to battery 1D00. When relays 1TU00 and 1TE00 operate, they provide a path through their operated armatures 1 and 2 from line 1L00 to trunk 3T0 and also provide an operating path for relay 2C00 from ground through the diode 2V0, the operated armature 6 of relay 1TU00, the operated armature 10 of relay 1TE00, and the winding of relay 2C00 to battery 2X00. The diode 2V0 which shunts the relay 3NT0 prevents it from operating at this time.

When relays 1TU00 and 1TE00 operate, an operating ground is also provided to the winding of relay 9LB through the diode 2V0, the operated armature 6 of relay 1TU00, the operated armature 10 of relay 1TE00, the operated armatures 10 of relays 1U0 and 1E0, the lead 3BT, and the operated armature 2 of relay 6TR0. When relay 9LB operates, it opens at its armature 1 the operating path for relay 8TP0 causing it to release and remove the connect potential from trunk 3T0. When the connect potential is removed, relay 1TK0 releases and tube 1CA0 deionizes but relays 1TU00 and 1TE00 remain operated from ground through the contacts of the normal armatures 1 and 2 of relay 1TK0. When relay 9LB operates, it also closes a path from lead 14LH0 through the operated armature 1 of relay 14VF0, the operated armature 2 of relay 9LB, the operated armature 1 of relay 9LH, the operated armature 3 of relay 9SM0, the operated 0 armature B of relay 6VGB0 through the winding of relay 8S0 to the associated battery 8B30 causing relay 8S0 to operate. When relay 8S0 operates, it in turn operates the slow release relay 8SR0 and closes the link tip and ring leads through its operated armatures 1 and 2 and the normal armatures 1 and 2 of relay 8TP0, respectively, to the trunk 3T0. When relay 8S0 operates, it also extends its operating ground path through its operated armature 3 to the link sleeve lead and when relay 8SR0 operates, it connects the grounded resistor 8A0 through its operated armature 3, the operated 0 armature F of relay 6VGB0 to the connector 1301.

When the marker 1305 receives the indication of crosspoint closure by the sleeve ground through the trunk frame 1303, it operates the trunk frame 1303 to connect an outgoing trunk, not shown, through the frame 8LLF and trunk 3T0 to the concentrator C0. In this manner, the line 1L00 is connected through trunk circuit 1T0, trunk 3T0, circuit 800 and the trunk frame 1303 to an outgoing trunk.

When the connection from line 1L00 to an outgoing trunk is completed as evidenced by the grounded sleeve link and an indication from the trunk frame 1303, the marker 1305 disconnects from the line and trunk frames. When the marker 1305 releases, it releases relays 14HG0, 14VF0, 6VGA0, 6VGP, 9SM0, 9LH and 9CB. When relay 6VGP0 releases, it in turn releases relay 6VGB0 and when relay 9CB releases, it releases relay 9TM1. When relay 6VGB0 releases, it in turn releases relay 14TRA which releases relay 14TRB and removes the readying battery 14B8 from register 1101. When relay 14TRB releases, it causes the operation of relay 14OPT. When relays 14HG0 and 14VF0 release, they in turn release relays 6TR0, 3TR0, 3TS and 9LB. When relay 3TS releases, it releases relays 3A2, 3A4, 3B4 and 3B7 and restores the register 400. When relays 3A2, 3A4, 3B4 and 3B7 release, they in turn release the number group relays 1E0 and 1U0. The relays 1TU00 and 1TE00 remain operated from ground at the normal armatures of relay 1TK0. When relay 6VGB0 releases, it in turn releases the select magnet 8SM0 but the operated crosspoint in the frame 8LLF remains closed under control of the operated one of the hold magnets 8HM0. Only the relays 1TU00, 1TE00 and 2C00 are operated in the concentrator C0 and the relays 8S0, 8SR0, 14OPT, 14RT and one of the hold magnets 8HM0 are operated in the central office concentrator control 1700.

*Disconnect*

When the calling or the called subscriber hangs up, ground is removed from the link sleeve lead of the frame 8LLF by the trunk frame 1303 allowing the sleeve relay 8S0 to release. If there is no call in progress in the concentrator C0, the associated preference relay 8TP0 is operated over a path from ground through the normal armature 4 of relay 8S0, the operated armature 1 of relay 8SR0, the lower winding of relay 8TP0, the normal armature 1 of relay 6VGP0, the normal armature 1 of relay 6VGP9 to battery 6B causing relay 8TP0 to operate. When relay 8TP0 operates, it applies the battery 8B10 through the resistors 8R00 and 8R01 to the tip and ring of the trunk 3T0 and also opens the locking circuit of relay 8SR0 at armature 5 of relay 8TP0 allowing it to release. The application of a positive potential to the trunk 3T0 causes the ionization of tube 1CA0 and the operation of relay 1TK0 which removes locking ground from relays 1TE00 and 1TU00. When relays 1TE00 and 1TU00 release, they in turn cause the release of relay 2C00.

When the slow release relay 8SR0 releases, it in turn releases the relay 8TP0 which removes the disconnect potential source 8B10 from the trunk 3T0 to release relay 1TK0 and deionize tube 1CA0 returning concentrator C0 to normal.

If a call is in progress at the concentrator C0 when either the called or calling subscriber disconnects, the relay 8SR0 locks operated through the back contact of armature 5 of relay 8PT0 which cannot operate until the existing call is served. If another call is being served by the concentrator C0, relay 6VGP0 is operated and the operating paths for relays 8TP0–9 are open at armature 1 thereof. In the meantime, the linkage through trunk 3T0 is held busy over the line link lead 14LL0 which is grounded through the contacts of relay 8SR0. When relay 6VGB0 releases after the other call is serviced, relay 8TP0 operates to complete the disconnect sequence described above. It is necessary, as described above, that facilities be available at the central office to record the existence of a call on trunk 3T0, to recognize a disconnect and to send a disconnect potential over trunk 3T0. Moveover, since the disconnect equipment is utilized in common by terminating calls and by disconnect, it is necessary to provide a lockout between the two types of usage. This is accomplished as described above, by the relays 8TP0–9 and the preference relays 6VGP0–9. If any one of the relays 6VGP0–9 is operated, the operation of relays 8TP0–9 during disconnect is delayed and if any one of relays 8TP0–9 is operated, the operation of relays 6VGB0–9 is delayed.

The concentrator system of the present invention incorporates the dial-tone lockout feature of the No. 5 crossbar system described in the above-identified patent to Busch wherein a dial-tone call will not be started if a call is being served in the control 1700. Also, if a terminating call to the same concentrator C0–9 obtains possession of the control 1700 after a dial-tone call is started and operates one of the relays 6VGB0–9 before dial-tone call progresses to operate one of the trunk preference relays 8TP0–9, the request for the dial-tone marker 1305 will be cancelled. This results from the fact that common signal leads are utilized and are given preference for use on terminating calls as described above.

*Terminating call*

In order that mutual lockout due to common usage of signaling leads may not exist between originating and terminating calls that occur simultaneously within the same concentrator, separate originating and terminating control equipment is used at the central office. Also, all calls are treated as terminating calls when establishing the connection at the concentrators C0–9. Transmission of information from the concentrators C0–9 is limited to passing the calling line number which is registered by the marker 1305. Thereafter, the call is treated as a terminating call. A terminating call to concentrator lines 1S00–49, 5S00–49, etc. is completed by the marker 1305 in a manner very similar to that described above for establishing a line-to-register or line-to-trunk connection for an originating call. The marker 1305 operates one of the relays 6VGB0–9 under control of the associated one of the relays 6VGP0–9 to operate relay 14TRA, one of the horizontal group relays 14HG0–9 and one of the vertical file relays 14VF0–4 which cause the operation of the transfer relays 6TR0 and 3TR0 and thereafter relay 3TS under control of relays 14TRA and 14TRB. The line number is then transmitted from the transmitter shift register 1101 to the concentrator shift register 400 to operated selected ones of the register relays in circuit 300. The number group relays 1E0–4 and 1U0–9 are thereupon operated as described above under control of the register relays. The operation of the number group circuit 1NG connects the line busy relay 9LB in the circuit 900 to the winding of one of the cut-off relays 2C00–49 that is associated with the called one of lines 1L00–49. If the called line is line 1L00, for example, and it is busy, the associated one of the cut-off relays 2C00 is operated and relay 9LB connected thereto operates as well. The operation of the relay 9LB opens the circuit to the line hold relay 9LH and returns ground over the leads 14LH0–4 corresponding in number to that of the operated one of the vertical file relays 14VF0–4, to the marker 1305. This indicates to the marker 1305 that the line is busy. The marker 1305 thereupon dismisses the control 1700 and the concentrator C0 and proceeds to return the line busy tone to the calling subscriber by connecting a busy trunk thereto.

If the called line is idle, the line busy relay 9LB remains non-operated. After waiting a predetermined interval normally required to permit the hold relay 9LH to release and the select magnet fingers to stop vibrating in case the line just became idle, the marker 1305 applies ground for operating the line hold relay 9LH. During this time delay, the marker 1305 applies battery to operate a selected one of the relays 9SM0–9 which is associated with the selected idle links 3T0–9. If trunk 3T9 is selected, relay 9SM9 is operated and in turn operates its associated select magnets 8SEL9 on the frame 8LLF and in conjunction with the operated line hold relay 9LH applies positive battery over the selected trunk towards the concentrator C0. This operates the associated trunk relays 1TK9 and closes the crosspoints or operates the trunk circuits 1T9 in a similar manner as described above for an originating call. In general, therefore, the sequence of operations for a terminating call is quite similar to that of a call-back call.

No-test and class of service

Class of service is provided on a per line basis as indicated in the control circuit 800. A cross-connection may be made from any one of the 50 line terminals 0–49 for each of the concentrators C0–9 to any one of the 30 class-of-service terminals marked 0–29. Each such class of service, as is well known in the art, identifies the type of line, such as flat rate, message rate, etc.

No-test calls provide direct access to the subscriber lines 1L00–49 whether they are idle or busy for testing or for operator verification. No-test calls to idle lines are completed in a similar manner as terminating calls described above with the addition that the no-test relay 9NT is operated by the marker 1305. When relay 9NT operates, it opens the locking path through its armature 10 for the relay 6R0 in the start circuit 600 to release any dial-tone call that may be waiting in the concentrator C0. This is necessary because the originating register 1306 which is ordinarily utilized to record the number of the calling line, as described above, is used on no-test calls to record the number of the trunk 3T0 connected to called busy line 1L00.

When relay 9NT operates, it transfers at its armatures 2 and 3 the input terminals of amplifier 11AMP2 to armatures 1 and 2 of relay 6NTR0 and at its armature 4 the output terminal of the register control 1200 to armature 3 of relay 6NTR0.

On no-test calls to busy lines, the call proceeds as a terminating call up to the point where a line busy test is made. The relay 9LB operates and in conjunction with the relay 9NT locks to +130 volt battery 9B2 and applies +130 volts to lead 3BT to the concentrator C0. Battery 9B2 is connected through the normal armature 4 of relay 9LH, the operated armature 7 of relay 9NT, the operated armature 4 of relay 9LB, resistor 9R2 and the winding of relay 9LB to battery 9B1 in order to hold relay 9LB operated, and from the operated armature 4 of relay 9LB through the operated armature 3 of relay 9LB, the operated armature 8 of relay 9NT, the operated armature 5 of relay 6VGB0 to the lead 3BT. The circuit is extended in the concentrator C0 to the armatures 10 of relays 1E0–5. Suppose, for example, the no-test call is for line 1L00 and, therefore, the number group relays 1E0 and 1U0 are operated. The path from lead 3BT is then extended through the operated armature 10 of relay 1T0, the operated armature 10 of relay 1U0 to the winding of relay 2C00 and also through the operated one of the trunk circuits 1T0–9 to the winding of the associated one of the no-test relays 2NT0–9. If trunk 3T0 is the busy trunk for line 1L00, the connection is through the operated armature 10 of relay 1TE00 and the operated armature 6 of relay 1TU00 to the grounded winding of relay 2NT0. Relay 2C00 remains operated and relay 2NT0 is operated by the positive potential from the central office. The relay 2NT0 operates, locks to the lead 3BT through its operated armature 3, closes a ground through its armature 4 to operate the relay 3NTA and also closes ground to selected ones of the control leads 4C2 preparatory to transmitting the identity of the trunk number in a two-out-of-five code to the central office. Relay 3NTA, which is connected to battery 3V1, operates and opens the transfer circuit through the lead 3TR at its armature 3, and operates the relay 3NTB over a path from ground through the operated armature 1 of relay 3NTA, the normal armature 1 of relay 30R1, the normal armature 1 of relay 3TR1, and the winding of relay 3NTB to battery 3V7. When relay 3NTB operates, it connects battery 3V6 through resistors 3R4 and armatures 1 through 5 of relay 3NTB to the shift register stages 4SR5–9, and connects the output amplifier 4AMP2 through its operated armature 8 and capacitor 3C3 to the primary winding of transformer 3NT1. The other end of the primary winding of relay 3NT1 is connected through the operated armature 7 of relay 3NTB to ground and the secondary of relay 3TN1 is connected to leads 3D1–2. When relay 3NTB operates, it also causes the operation of relay 3NTC which provides a pulse from battery 3V4 through capacitor 3C1 to set the stages 4SR5–9 in accordance with the identity of the utilized one of trunks 3T0–9. Capacitor 3C1 is conected through lead 3L1 and the operated armatures 1 and 2 of relay 2NT0 to the set terminal of stages 4SR8 and 4SR9. The same coding is utilized for no-test and for the units digit and is shown in Fig. 18. The concentrator C0 is now prepared for outpulsing the trunk number to the central office.

When the transfer circuit through lead 3TR is opened by relay 3NTA, relays 3TR0, 3TS and 6TR0 release. Relay 2NT0 which was operated as described above over a path through the operated armature 5 of relay 6TR0 does not release but remains operated through a locking path from the operated armature 3 of relay 2NT0, lead 3BT, the operated armature 5 of relay 6VGB0, the operated armature 2 of relay 9NT, the operated armatures 3 and 4 of relay 9LB, the operated armature 3 of relay 9NT, and the normal armature 4 of relay 9LH to battery 9B2. When the relay 6TR0 releases, the no-test transfer relay 6NTR0 in the signal circuit 6SIG0 operates and transfers the leads 3D1–2 to the amplifier 11AMP2 and the leads 3S1–2 to the control 1201 to ready the central office for receiving the no-test information. The operating path for relay 6NTR0 is from ground through the operated armature 9 of relay 9NT, the operated armature 5 of relay 9LB, the operated armature 1 of relay 6VGB0, the normal armature 1 of relay 6TR0, and the winding of relay 6NTR0 to battery 6B2. When relay 6NTR0 operates, it transfers at its armatures 1 and 2 the leads 3D1–2 to the input terminals A and B of amplifier 11AMP2, transfers the lead from transformer 6NT2 at its armature 3 to the output of control 1201 and causes the operation of relay 14SRA. Relay 14SRA operates over a path from ground through the operated armature 4 of relay 6NTR0, the operated armature 1 of relay 9NT, the winding and the relay 14SRA to battery 14B5. When relay 14SRA operates, it connects the translator circuit 1000 to the shift register 1100 and operates the relay 14SRB. When relay 14SRB operates, it causes the information which is stored in the concentrator register 400 to be shifted or transferred to the register 1100 in the central office in a similar manner as described above for initiating a call from the line 1L00. When relay 14SRB operates, the battery 14B19 is connected to the register control 1201 to initiate the shifting sequence of operations and ground is removed from the winding of relay 14RT causing it to release. After the shifting operation, the trunk identifying number 00 is stored in the shift register stages 11SR5–9 and relay 14RT finally releases. As the shift register stages 14SR1–9 are operated during the shifting sequence of operation, the relays in the translator circuit 1000 are operated in accordance therewith. At the completion of the shifting sequence the relays 10B4 and 10B7 are operated and when relay 14RT finally releases. When relay 14RT releases, it connects ground through the operated armatures of relay 10B4 and 10B7 to the associated relays 10B'4 and 10B'7. When relays 10B'4 and 10B'7 operate, they in turn cause the operation of the check relay 14CK1, the operating path for relay 14CK1 from battery 14B16 through the winding of relay 14CK1, the operated armature 6 of relay 9NT, the operated armatures 1 of relays 10B'7 and 10B'4, the normal armatures 1 of relays 10B'2, 10B'1 and 10B'0 and the operated armature 9 of relay 9NT to ground. When relay 14CK1 operates, it provides a connection from the grounded resistor 9R1 through the normal armature 2 of relay 10B'0, the normal armatures 4 of relays 10B'1 and 10B'2, the operated armature 4 of relay 10B'4 and the operated armature 3 of relay 10B'7 and the 0 lead through cable 10CA to the line link connector 1301 as an indication to the marker of the identity of trunk 3T0.

When the marker 1305 received the line busy indication described above, it applied a positive potential of approximately 10 volts to the lead 14LH0. When relays 10B4 and 10B7 in the translator 1000 operate, the 10 volts on lead 14LH0 are connected through the operated armature 1 of relay 14VF0, the operated armature 2 of relay 9LB, the normal armature 1 of relay 9LH grounded by resistor 9R1 through the translator 1000 as described above to lead 14LH0.

When the marker 1305 receives the identification of the busy trunk 3T0 it operates the no-test connector 1304 to connect it to the trunk control circuit 800 in the signal circuit 6SIG0. The connector 1304 applies ground through cable 13C8, lead 8H, the back contact of the normal armature of relay 9NTH, the operated armature 5 of relay 9T, the operated armature 1 of relay 9SM0, the 0 armature D of relay 11VGB0, and the winding 8NTC0 to its associated battery 8B50 causing relay 8NTC0 to operate. When relay 8NTC0 operates, it connects the link leads 8T, 8R and 8S from the no-test connector circuit 1504, across the line-to-trunk connection from line 1L00 through trunk 3T0 and the frame 8LLF to the trunk frame 1303. When relay 8NTC0 operates, it also causes the operation of the relay 9NTH by extending its operating path through its operated armature 4 to the winding of relay 9NTH. When relay 9NTH operates, it locks to ground through lead 9H, extends its locking ground for the relay 8NTC0 and prevents the other no-test connector relays 8NTC1–9 from being operated while the no-test connector 1304 is in use by opening their operating paths through the normal back contact of relay 9NTH. The relay 9NTH in this manner locks the relay 8NTC0 to the no-test connector 1304 under control of the latter circuit and independently of the control circuit 800 or the connector circuit 900. The marker 1305 disconnects from the connector 1304 a predetermined interval after connecting it to the trunk 3T0. When the marker disconnects, it releases relays 9SM0, 9NT, 14VF0, 14HG0 and 6VGP0. When relay 6VGP0 releases, it in turn releases relay 6VGB0 to open the locking path through lead 3BT for relay 2NT0 causing it to release. When relay 2NT0 releases, it opens the connections to register 400 and releases relay 3NTA. When relay 3NTA releases, it opens the operating path for relay 3NTB causing it to release and in turn release relay 3NTC. When relay 3NTB releases, it removes battery 3V6 for terminals R of stages 4SR5–9 and opens the connection from the output amplifier 4AMP2 to leads 3D1–2. When relay 6VGB0 releases, it opens the operating path for relay 6NTR0 causing it to release and when relays 14VF0 and 14HG0 release, the operating path for relay 9LB is opened causing it to release. Only the relays 2C00, 1TE00 and 1TU00 in concentrator C0 and relays 8NTC0, 8S0, 8SR0, 14OPT, 14RT and the hold magnet 8HM9 in the central office remain operated. The relay 8NTC0 as described above is held operated under control of the connector 1304 and the other relays remain operated until disconnect also as described above.

It is to be understood that the above-described arrangements are illustrative of the application of the principles of this invention. Numerous other arrangements may be devised by those skilled in the art without departing from the spirit and scope of the invention.

What is claimed is:

1. A line concentrator telephone system comprising a plurality of subscriber lines; a central office; a plurality of talking trunks less in number than said plurality of lines and extending from said central office; and an automatic line concentrator for connecting any one of said lines with any one of said trunks; said concentrator having a line lockout circuit for detecting the calling condition of any one of said lines and for determining the identity of said calling line, means responsive upon the operation of said line lockout circuit for providing a service request indication to said central office, and a register circuit controlled by said lockout circuit for supplying time pulse coded signals representing the identity of said calling line to said central office; said central office having a receiving register circuit for receiving said coded signals from said concentrator register circuit, a pulse generator for synchronously operating said concentrator and said receiving register circuits and a readying circuit responsive upon the reception of said service request indication from said concentrator for initiating the operation of said pulse generator.

2. A line concentrator telephone system in accordance with claim 1 wherein said central office comprises in addition a transmitting register circuit, means for disconnecting said receiving register circuit from said concentrator register circuit and for connecting said transmitting register circuit to said concentrator register, and control means for disconnecting said pulse generator from said receiving register circuit and for connecting said pulse generator to said transmitting register circuit and for initiating the operation of said pulse generator.

3. A line concentrator telephone system in accordance with claim 2 wherein said central office comprises in addition means controlled by said receiving register circuit for selecting an idle one of said talking trunks and for operating said disconnecting and connecting means and said control means, and means controlled by said selecting and operating means for supplying a connect potential over said selected trunk to said line concentrator, and wherein said line concentrator comprises in addition means responsive upon the reception of said connect potential and controlled by said concentrator register circuit for connecting said selected trunk to said calling line.

4. A line concentrator telephone system comprising a plurality of subscriber lines; a central office; a plurality of talking trunks less in number than said plurality of lines and extending from said central office; a plurality of control leads less in number than said plurality of talking trunks and extending from said central office; a line concentrator connected to said talking trunks, to said control leads and to said subscriber lines for providing a connection between any one of said subscriber lines and any one of said talking trunks; a shift register signaling circuit at said concentrator responsive to the calling condition of any one of said lines for transmitting time division coded signals representing the identity of said calling line over two of said control leads to said central office; a receiving shift register circuit at said central office for receiving said signals; control means at said central office controlled by said receiving shift register circuit for selecting an idle one of said talking trunks; a transmitting shift register circuit at said central office controlled by said control means for transmitting time division coded signals back over said two control leads to said concentrator shift register circuit; and circuit means at said concentrator individual to each of said talking trunks controlled by said central office control means and said concentrator shift register circuit for establishing a connection between said selected trunk and said calling line.

5. A line concentrator telephone system in accordance with claim 4 wherein said control leads include two signal leads and two shift leads connected to said concentrator shift register circuit and a test lead, and wherein are provided means at said line concentrator responsive to the calling condition of any one of said lines for providing a service request indication over said test lead to said central office, a starting circuit at said central office connected to said test lead for readying said receiving shift register circuit, and a pulse generating circuit at said central office responsive upon the operation of said start circuit for supplying shift pulses to said receiving shift register circuit and over said shift leads to said concentrator shift register circuit.

6. A line concentrator telephone system in accordance with claim 5 wherein said control leads comprise in addition a transfer lead and said central office comprises in addition means responsive to the operation of said control means for supplying a transfer signal over said transfer lead to ready said concentrator shift register circuit for receiving signals from said central office.

7. A line concentrator telephone system in accordance with claim 6 comprising in addition means at said central office responsive to the initiation of a terminating call to one of said subscriber lines for operating said control means to select an idle one of said talking trunks and to simultaneously operate said transmitting shift register circuit to transfer time division coded signals representing the identity of said called line over said two signal leads to said concentrator shift register circuit.

8. A line concentrator telephone system in accordance with claim 7 wherein said control means includes means connected to said test lead for registering a line busy indication and said concentrator comprises means for providing a line busy indication to said test lead.

9. A telephone system comprising a plurality of subscriber telephones; a satellite office; a subscriber line connecting each of said telephones to said satellite office; a central office remote from said satellite office; a plurality of trunks connecting said satellite office to said central office, the number of said trunks being less than the number of said subscriber lines; switching means within said satellite office for connecting any one of said trunks to any one of said subscriber lines; switch controller means in said satellite office determining the operation of said switching means on reception of coded information from said central office; shift register transmitting and receiving means within said central office; shift register transmitting and receiving means within said satellite office; means for synchronously operating said central office shift register and said satellite office shift register means for transferring coded information representing the identity of one of said subscriber lines from said central office to said satellite office; means at said central office responsive to the initiation of a call to one of said subscriber lines for registering the identity of said called line in said central office shift register means; and means responsive to the initiation of a call to one of said subscriber lines for providing a connect potential over a selected one of said trunks and for initiating the operation of said synchronously operating means.

10. A telephone system in accordance with claim 9 comprising in addition a line lockout and identifier circuit at said satellite office responsive upon the initiation of a calling condition on any one of said subscriber lines for identifying said calling line and for locking out all the others of said subscriber lines, means controlled upon the operation of said line lockout and identifier circuit for providing a service request indication to said central office and for supplying the identity of said calling line to said concentrator shift register means, and means at said central office responsive upon the reception of said service request indication for selecting an idle one of said trunks and for initiating the operation of said synchronously operating means to transfer the calling line identity to said central office shift register means.

11. In a telephone system, a central office; a group of subscriber lines; a line relay individual to each of said lines; a plurality of trunk circuits serving said subscriber lines and located at a distance from said central office; a trunk connecting each of said trunk circuits with said central office; common operating means associated with said trunk circuits; means in said central office for selecting an idle one of said trunks and for causing said common operating means to operate said trunk circuit associated with said selected trunk to connect one of said lines with said central office over said selected trunk; a shift register signaling system partially associated with said common operating means and partially located in said central office and controlled upon the operation of one of said line relays for transmitting the identity of said operated line relay; and means controlled by said shift register system for operating said selecting and causing means.

12. In a telephone system, the combination in accordance with claim 11 wherein said shift register system comprises a plurality of control leads and means for supplying coded signals over said leads to and from said central office, wherein said selecting means comprises means for supplying a connecting potential over said selected trunk, and wherein said central office comprises in addition disconnect means for inhibiting said coded signal supplying means but not said connecting potential supplying means to cause the operated one of said trunk circuits to disconnect said selected trunk from said line connected thereto.

13. In a telephone system in accordance with claim 12 the provision of additional means for supplying on a simplex loop basis over said control leads the operating power for said line relays, said trunk circuits, said common operating means, and the portion of said shift register system partially associated with said common operating means.

14. A remote line telephone system comprising a plurality of telephones, a subscriber line connected to each of said telephones, a central office, a plurality of trunks extending from said central office, switching means defining talking path crosspoints between any one of said subscriber lines and any one of said trunks, a signal path and a signal control path extending from said central office, a shift register signaling system for transmitting coded signals representing the identity of one of said subscriber lines to and from said central office, said signaling system having a remote shift register circuit associated with said switching means and a central office shift register circuit connected at opposite ends of said signal path and said signal control path, means responsive to the initiation of a calling condition on one of said lines for operating said remote shift register circuit to supply the identity of said calling line over said signal path to said central office shift register circuit, means at said central office controlled by said central office shift register circuit for selecting an idle one of said trunks and for supplying a connect potential thereto and for operating said central office shift register circuit to return the calling line identity over said signal path to said remote shift register circuit, and means associated with said switching means and responsive upon the reception of said connect potential and upon the operation of said remote shift register circuit for operating said switching means to connect said calling line to said selected trunk.

15. In a telephone system, a central office; a plurality of concentrator units remotely located from said central office; a plurality of trunks connecting each of said concentrator units with said central office; a plurality of subscriber stations connected to each of said concentrator units; said concentrator units each comprising a crosspoint trunk circuit for each of said trunks connected thereto for providing a connection between any one of said stations connected thereto with any one of said trunks connected thereto, an identifying circuit for identifying a calling one of said lines, a shift register signal circuit controlled by said identifying circuit for transmitting the identity of said calling line to said central office, and a number group circuit controlled by said shift register circuit during a central office-to-concentrator transmitting operation to control the operation of said trunk circuits; said central office comprising a common control circuit and a plurality of signal circuits associated individually with said concentrator units, said control circuit comprising a shift register circuit synchronously operated with said concentrator shift register circuit and means controlled by said central office shift register circuit for selecting an idle one of said trunks and for synchronously reoperating said central office shift register circuit with said concentrator shift register circuit to return the calling line identity to said concentrator, said signal circuits comprising means controlled by said selecting means for applying a connect potential over said selected trunk to said trunk circuit associated therewith and means for locking out all of said concentrator units except the said concentrator unit to which said calling station is connected and means for establishing a preference for terminating calls over originating calls, said control circuit also comprising terminating circuit means for servicing a call to one of said stations by selecting an idle one of said trunks and synchronously operating said central office shift register circuit and said concentrator shift register circuit.

16. A line concentrator telephone system comprising a plurality of subscriber lines; a central office; a plurality of talking trunks less in number than said plurality of lines and extending from said central office; a plurality of control trunks less in number than said plurality of talking trunks and extending from said central office; a line concentrator connected to said talking trunks, said control trunks and to said subscriber lines for connecting said subscriber lines with said talking trunks; a signal transfer system including said control trunks for transferring coded signals representing the identity of a calling one of said lines, said transfer system comprising a shift register circuit at said concentrator and a shift register circuit at said central office and means responsive to a calling condition of any one of said lines for synchronously operating said concentrator and said central office shift register circuits; responsive means at said central office and controlled by said central office shift register circuit for selecting an idle one of said talking trunks and for reversing the operation of said signal transfer system to transfer coded signals in the opposite direction; circuit means at said concentrator individual to each of said talking trunks and controlled by said concentrator shift register circuit and by said responsive means for establishing a connection between said selected trunk and said calling line; and means for supplying on a simplex basis over said control trunks all of the power necessary for the operation of said concentrator and of said subscriber lines.

17. A line concentrator telephone system in accordance with claim 16 comprising in addition disconnect means at said central office responsive to a disconnect condition on said calling line for transmitting direct-current signals over said selected trunk while preventing the transmission of any signals over said control trunks to said line concentrator for controlling said circuit means to disconnect said calling line from said selected trunk.

18. A line concentrator telephone system comprising a plurality of subscriber lines; a central office; a plurality of talking trunks less in number than said plurality of lines and extending from said central office; a plurality of control leads less in number than said plurality of talking trunks and including two signal leads and two shift leads and extending from said central office; a line concentrator connected to said talking trunks, to said control leads and to said subscriber lines for providing a connection between any one of said subscriber lines and any one of said talking trunks; a shift register signaling circuit at said concentrator responsive to the calling condition of any one of said lines and operated under control of shift pulses over said two shift leads from said central office for transmitting over said two signal leads to said central office time division coded signals representing the identity of said calling line; a receiving shift register circuit at said central office for receiving said signals; means for supplying shift pulses to said receiving central office shift register circuit and over said shift leads to said concentrator shift register circuit; control means at said central office controlled by said receiving shift register circuit for selecting an idle one of said talking trunks; a transmitting shift register circuit at said central office controlled by said control means and by said shift pulse supply means for transmitting time division coded signals over said two signal leads to said concentrator shift register circuit; circuit means at said concentrator individual to each of said talking trunks and controlled by said central office control means and by said concentrator shift register circuit for establishing a connection between said selected trunk and said calling line; and means for supplying on a simplex loop basis over said signal leads and over said shift leads all of the power necessary for the operation of said concentrator.

19. A line concentrator telephone system in accordance with claim 18 comprising in addition means at said central office responsive to the initiation of a terminating call to one of said subscriber lines for operating said control means to select an idle one of said talking trunks and to simultaneously operate said transmitting shift register circuit to transfer over said two signal leads to said concentrator shift register circuit time division coded signals representing the identity of said called line.

20. A line concentrator telephone system comprising a plurality of subscriber lines; a central office; a plurality of talking trunks less in number than said plurality of lines and extending from said central office; and an automatic line concentrator for connecting any one of said lines with any one of said trunks; said concentrator having a line lockout circuit for detecting the calling condition of any one of said lines and for determining the identity of said calling line, means responsive upon the operation of said line lockout circuit for providing a service request indication to said central office, a shift register circuit controlled by said lockout circuit for ordinarily supplying to said central office time pulse coded signals representing the identity of said calling line, and means responsive to a no-test indication from said central office to a busy one of said subscriber lines for controlling said shift register circuit to supply to said central office time pulse signals representing the identity of the one of said talking trunks connected to said busy line; said central office having a receiving shift register circuit for receiving said coded signals from said concentrator shift register circuit, a shift pulse generator for synchronously operating said concentrator and said receiving shift register circuits, a readying circuit responsive upon the reception of said service request indication from said central office for initiating the operation of said shift pulse generator, and means for providing to said concentrator a no-test indication for one of said lines.

21. A line concentrator telephone system comprising a plurality of subscriber lines; a central office; a plurality of talking trunks less in number than said plurality of lines and extending from said central office; a plurality of control trunks less in number than said plurality of talking trunks and extending from said central office; a line concentrator connected to said talking trunks, to said control trunks and to said subscriber lines for connecting said subscriber lines with said talking trunks; a signal transfer system including said control trunks for transferring coded signals ordinarily representing the identity of a calling one of said lines and comprising a shift register circuit at said concentrator, a shift register circuit at said central office, and means responsive to a calling condition of any one of said lines for synchronously operating said concentrator and said central office shift register circuits; responsive means at said central office controlled by said central office shift register circuit for selecting an idle one of said talking trunks and for reversing the operation of said signal transfer system to transfer coded signals in the opposite direction; circuit means at said concentrator individual to each of said talking trunks and controlled by said concentrator shift register circuit and by said responsive means for establishing a connection between said selected trunk and said calling line; means for supplying on a simplex basis over said control trunks all of the power necessary for the operation of said concentrator and said subscriber lines; no-test control means at said central office for providing a no-test signal to said concentrator over said control trunks and for operating said central office responsive means; no-test responsive means at said concentrator controlled by said concentrator shift register and responsive upon the reception of said no-test signal for operating said signal transfer system to transfer coded signals representing the identity of the one of said talking trunks connected to said line being no-tested; and means at said central office responsive to the operation of said signal transfer system for providing a no-test bridging connection to said busy trunk.

22. A two-way signaling system for line concentrators adapted to connect a plurality of subscriber lines through a smaller plurality of trunks to a central office comprising a shift register at each of said line concentrators, a receiving shift register at said central office for receiving identifying signals from any one of said concentrator shift registers, a control path and a signal path for each of said concentrators, means including one of said control paths and responsive to the initiation of a calling condition on any one of said subscriber lines for synchronously operating the associated one of said concentrator shift registers and said receiving shift register for transferring over said associated signal path signals representing the identity of said calling line, and means responsive to said synchronously operating means for selecting an idle one of said trunks and for supplying to said associated concentrator a connect signal over said selected one of said trunks.

23. A two-way signaling system in accordance with claim 22 comprising in addition a transmitting shift register at said central office for transmitting identifying signals to any one of said concentrators, and means including said control paths for synchronously operating any one of said concentrator shift registers and said transmitting shift register for transferring over the associated one of said signal paths signals representing the identity of a wanted one of said subscriber lines.

24. A two-way signaling system in accordance with claim 23 comprising in addition means operative concurrently with said second-mentioned synchronously operating means for supplying a no-test signal to any one of said concentrators, means at each of said concentrators responsive to said no-test signal and controlled by the associated one of said concentrator shift registers for supplying to the associated concentrator shift register the identity of any one of said trunks connected to said wanted line, and means responsive upon the operation of said supply means for initiating the operation of said first-mentioned synchronously operating means.

References Cited in the file of this patent
UNITED STATES PATENTS

| | | |
|---|---|---|
| 2,532,097 | Hersey | Nov. 28, 1950 |
| 2,715,657 | Andrews | Aug. 16, 1955 |
| 2,724,746 | Bruce et al. | Nov. 22, 1955 |